(12) United States Patent
Keenan

(10) Patent No.: US 10,532,296 B1
(45) Date of Patent: Jan. 14, 2020

(54) FILTER CONTROLLER

(71) Applicant: K.T.I. Systems, Inc., Southwick, MA (US)

(72) Inventor: Andrew D. Keenan, Southwick, MA (US)

(73) Assignee: K.T.I. Systems, Inc., Southwick, MA (US)

( * ) Notice: Subject to any disclaimer, the term of this patent is extended or adjusted under 35 U.S.C. 154(b) by 102 days.

(21) Appl. No.: 15/701,546

(22) Filed: Sep. 12, 2017

Related U.S. Application Data

(60) Provisional application No. 62/393,186, filed on Sep. 12, 2016.

(51) Int. Cl.
```
B01D 35/30      (2006.01)
B01D 35/12      (2006.01)
F02M 37/44      (2019.01)
B01D 17/02      (2006.01)
B01D 21/00      (2006.01)
F02M 37/22      (2019.01)
F02M 37/24      (2019.01)
```

(52) U.S. Cl.
CPC ....... B01D 17/0208 (2013.01); B01D 21/003 (2013.01); B01D 35/12 (2013.01); B01D 35/30 (2013.01); F02M 37/22 (2013.01); F02M 37/24 (2019.01); F02M 37/44 (2019.01)

(58) Field of Classification Search
CPC ........ B01D 29/52; B01D 35/12; B01D 35/30; B01D 35/301; F02M 37/0047; F02M 37/22; F02M 37/24; F02M 37/44
USPC .................................................. 210/340, 341
See application file for complete search history.

(56) References Cited

U.S. PATENT DOCUMENTS

| | | | | |
|---|---|---|---|---|
| 5,073,260 | A * | 12/1991 | Wilkendorf | B01D 35/12 210/238 |
| 6,485,636 | B1* | 11/2002 | Moss | B01D 35/12 210/117 |
| 6,668,860 | B1* | 12/2003 | Pas | B01D 35/12 137/545 |
| 2002/0020681 | A1* | 2/2002 | Koivula | B01D 29/114 210/798 |

\* cited by examiner

*Primary Examiner* — Terry K Cecil
(74) *Attorney, Agent, or Firm* — Doherty, Wallace, Pillsbury + Murphy, P.C.

(57) ABSTRACT

A filter controller which comprises a manifold and at least one filter assembly. The manifold comprises a plurality of portholes and channels into and through which a fluid, such as, e.g., a fuel, may flow. The filter assembly comprises an upper filter subassembly and a lower filter subassembly. The filter assembly can be fitted directly onto the manifold without the use of pipes and fittings and such that the filter assembly is in fluid communication with the portholes and channels necessary for effective filtering, polishing, and flow of the fluid through the system and through the assembly into which the system is integrated.

15 Claims, 30 Drawing Sheets

SECTION B-B

SECTION C-C

SECTION D-D

SECTION B-B

SECTION C-C

SECTION D-D

SECTION F-F

SECTION E-E

SECTION G-G  FIG. 21

FILTER CONTROLLER

BACKGROUND OF THE INVENTION

1. Field of the Invention

The invention relates generally to a filter controller. More specifically, the invention relates to a filter controller for filtering and polishing fuel, wherein, in an exemplary embodiment, the filter controller may be integrated into, e.g., a diesel fueled assembly, an ethanol-containing fuel assembly, a gasoline fueled assembly, and a gas turbine fueled assembly.

2. Background of the Invention

Conventionally known filter systems that are used to filter fuel, such as may be found, e.g., in the operation of generators, gas turbines, and internal combustion engines, such as gasoline engines, diesel engines used to generate electrical power, and diesel engines in trucks, aircraft, trailers, recreational vehicles, boats, and off road equipment, consist of a complicated system comprising a large network of pipes and fittings. Additionally, such filter systems do not have an efficient ability to polish the fuel, i.e., remove water and certain particle contaminants from the fuel. Such unpolished fuel leads to overall system failure as the water and/or the particle contaminants can adversely affect the operation of the engine.

Referring to FIG. 32, a conventional diesel fuel assembly comprises a fuel storage tank 1 in-line with a primary filter 2, wherein primary filter 2 is in-line with a fuel pump 3. A secondary filter 4 connects fuel pump 3 with injector pump 5, wherein injector pump 5 comprises injection nozzles that send the fuel from injector pump 5 into an engine. During normal use, fuel storage tank 1 collects dirt, water, varnishes, rust, and bacteria. The increased level of contaminants in tank 1 cause primary fuel filter 2 to clog at a much faster rate than if fuel storage tank 1 did not collect such debris. As the clogged fuel filter 2 prevents the fuel from reaching the engine, the engine ultimately shuts down. However, prior to shutdown, engine driven fuel pump 3 will naturally increase its vacuum to draw more fuel across primary filter 2. Because of this increase in vacuum, any loose hose clamps or poor connections will allow air to enter the fuel system, wherein such excess air reduces the overall efficiency of the system and can cause the engine to shut down.

Therefore, what is needed is a filter controller that can provide protection over what is provided by traditionally known filter systems, and that can efficiently filter and polish the fuel, provide advanced water and clogged filter warning, and provide the ability to check the integrity of the system. Further needed is a filtering system that has the added benefit of detecting and responding to a variety of warning signals, wherein such signals may include the need to polish the fuel, water detection, clogged filter, and the like. What is also needed is a filter controller which includes more than one filter to thereby provide a backup filter should one of the filters malfunction. Further needed is a filter controller which allows for the ready accessibility to the filter to thereby allow the ready replacement, servicing and/or repair of the filter. Further needed is the ability to use a low micron filter media, and advanced water detection which will, thereby, reduce the chance of having contaminants enter the engine filter, which in turn will reduce the chance that contaminants will enter the high pressure system.

SUMMARY OF THE INVENTION

The problems discussed above are eliminated or greatly reduced by a filter controller which can be integrated into, e.g., an internal combustion engine, or a gas turbine, wherein the filter controller comprises a manifold and at least one filter assembly. The manifold comprises a plurality of portholes and channels into and through which a fluid, such as, e.g., a fuel, may flow. The filter assembly comprises an upper filter subassembly and a lower filter subassembly. The lower filter subassembly is particularly useful in separating heavy particle contaminants and water from the fuel. Such wastes can be removed from the system via a drain port. The filter assembly can be fitted directly onto the manifold without the use of pipes and fittings and such that the filter assembly is in fluid communication with the portholes and channels necessary for effective filtering, polishing, and flow of the fluid through the system and through the assembly into which the system is integrated. The filter controller may be actuated either manually or automatically based upon readings provided by a water sensor, a pressure sensor, a pressure gauge, and the like.

DETAILED DESCRIPTION OF THE INVENTION

Figure 1:
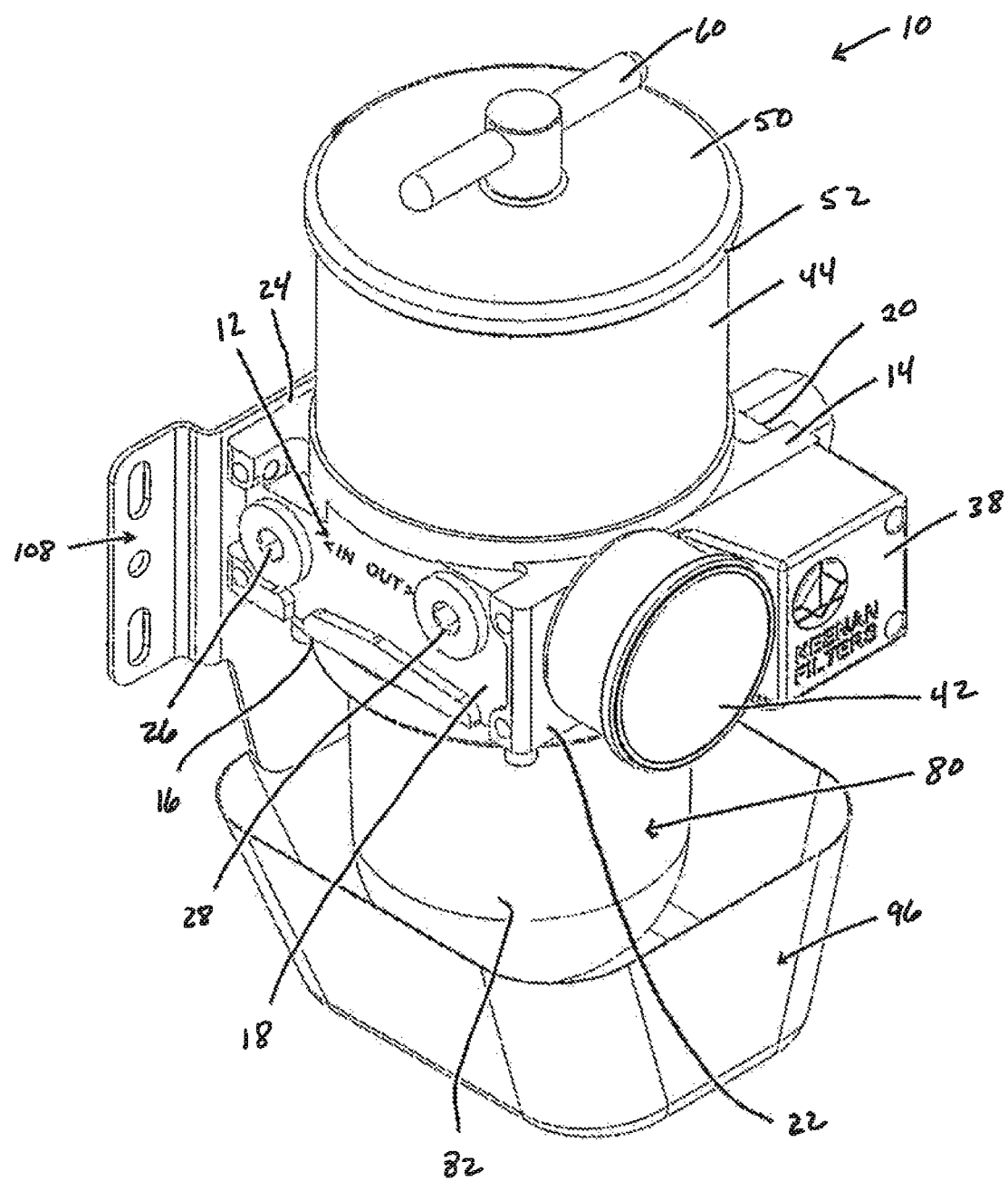
FIG. 1 is a schematic depicting an elevational view of an exemplary filter controller.

Disclosed herein is a filter controller comprising a manifold to which one or more filter assemblies are attached, preferably by way of bolts, thereby eliminating the need for traditionally used conduits, pipes, and fittings. Therefore, the filter controller is distinguishable over the prior art in that, e.g., it has internalized the plumbing used to create a functional filter controller wherein the plumbing is located inside the controller rather than outside thereof. The manifold comprises a plurality of portholes and channels into and through which a fluid, such as, e.g., fuel, flows when pumped through, e.g., a fuel assembly.

Each of the one or more filter assemblies comprises an upper filter subassembly and a lower filter subassembly. The upper filter subassembly comprises a filter member positioned and contained within a housing.

The lower filter subassembly comprises a specially designed fuel stator and a specially designed diffuser cone. The fuel stator comprises a body having a series of vanes disposed thereon. The fuel stator further comprises an outer ring of vanes positioned over the series of vanes. The lower filter subassembly further comprises a bowl which is held by the manifold, and which surrounds the fuel stator and the diffuser cone.

Where the filter controller comprises a single filter assembly, in an exemplary embodiment, the housing of the upper filter subassembly is disposed on a top side of the manifold and a stem member is disposed through and secured to a porthole formed through the manifold. In this orientation, the upper filter subassembly and the lower filter subassembly are in fluid communication with one another.

In this embodiment, the manifold further comprises an inlet porthole and a corresponding inlet channel through which the fuel enters the filter assembly from a fuel storage tank and an engine porthole and a corresponding engine channel, through which the fuel exits to flow into the engine of the assembly.

Where the filter controller comprises a single filter assembly, fuel enters the filter assembly via the stem member. From the stem member, the fuel is emitted to the fuel stator. As the fuel passes the series of vanes, a centrifuge forms, thereby causing the fuel to take on a circular motion. The circular motion of the fuel causes contaminants, such as, e.g., water and fuel contaminating particulates, to separate from the fuel and to drop to the bottom of the bowl. The fuel moves upwards and as it makes contact with the outer ring of vanes, the circular motion and the velocity of the fuel is dampened and contaminants are further separated from the fuel. The fuel continues its upward movement and flows into the diffuser cone. The diffuser cone is configured such that the velocity of the fuel, as it moves through the inside of the diffuser cone, is reduced. Such reduction in velocity causes further separation of contaminants from the fuel. From the diffuser cone, the fuel then flows into the upper filter subassembly where it is further filtered via the filter member.

In an exemplary embodiment, the single filter assembly may include a pump that provides a force to assist in polishing the fuel, i.e., which sends the fuel that has been filtered via the upper and lower filter subassemblies back to a storage tank from which the fuel originated. Here, the manifold of the assembly may include an outlet port and a corresponding outlet channel which are in fluid communication with the filter member. Based upon a force generated by the pump, the fuel may move through the lower and upper filter subassemblies, and then flow from the filter member of the upper filter subassembly, through the outlet portion, and through the outlet channel which leads back to the storage tank. In this embodiment, the engine porthole may also supply the engine with fuel or it may be plugged to thereby prevent the fuel from flowing to the engine. In an especially preferred embodiment, the pump is physically attached to the manifold.

Where the filter controller comprises two filter assemblies, in an exemplary embodiment, the manifold comprises a first flow housing, a second flow housing, and a directional flow housing, wherein the directional flow housing is sandwiched between the first and second flow housings, and further wherein, in a preferred embodiment, the first and second flow housings are bolted to the directional flow housing. Each of the first and second flow housings has a top side oppositely situated to a bottom side, wherein the top and bottom sides of the first flow housing are in fluid communication with one another, and the top and bottom sides of the second flow housing are in fluid communication with one another.

The filter housing of the first filter assembly is disposed on the top side of the first flow housing, and the filter housing of the second filter assembly is disposed on the top side of the second flow housing. The stem member from the first filter assembly is positioned through the bottom side of the first flow housing, and the stem member from the second filter assembly is positioned through the bottom side of the second flow housing. Each of the stem members of the filter assemblies further includes a stem tube through which fuel enters the fuel stator.

Additionally, each of the first and second flow housings comprises an inlet port and an inlet channel formed therethrough and an outlet port and an outlet channel formed therethrough. The stem tube of the first filter assembly is disposed within the outlet channel of the first flow housing and is in fluid communication with the outlet port of the first flow housing, while the stem tube of the second filter assembly is disposed within the outlet channel of the second flow housing and is in fluid communication with the outlet port of the second flow housing.

Additionally, the inlet port of the first flow housing is aligned with and connected to an inlet port formed on a posterior side of the directional flow housing of the manifold, and the outlet port of the first flow housing is aligned with and connected to an outlet port formed on the posterior side of the directional flow housing. The inlet port of the second flow housing is aligned with and connected to an inlet port formed on an oppositely situated anterior side of the directional flow housing, and the outlet port of the second flow housing is aligned with and connected to an outlet port formed on the anterior side of the directional flow housing.

The inlet ports of the directional flow housing lead into an inlet channel, wherein fuel from the storage tank enters the directional flow housing and then into either the first flow housing and, consequently, into the first filter assembly, or into the second flow housing and, consequently, into the second filter assembly. The outlet ports of the directional flow housing lead into an outlet channel and to an engine channel.

In a preferred embodiment, the fuel moves through the lower and the upper filter subassemblies in the manner described above with reference to the single filter assembly. However, after having passed through the filter member, the fuel then moves into the outlet channel of the directional flow housing, whereby the fuel is then returned to the fuel storage tank via the outlet port, used to service the offline filter, or is sent to the engine of the diesel fuel assembly via the engine channel.

Either one or both of the first and second flow housings may further comprise at least one additional inlet port and at least one additional outlet port and corresponding inlet and outlet channels, whereby a pump can be attached to the inlet and outlet ports of the respective first and second flow housings via an inlet conduit and an outlet conduit. The pump may be used for purposes of polishing, i.e., driving the filtered fuel back to a storage tank, for purposes of driving the filtered fuel to an engine, and for purposes of driving the fuel back through the filter controller.

The pump further assists in servicing a malfunctioning filter member. For example, when the filter controller provides a signal that a filter member needs to be replaced or repaired, a user need only switch a valve that allows the pump to pressurize the filter controller. This increased pressure forces contaminants collected within the bowl of the lower filter subassembly out of the bowl via an outlet located on the bottom of the bowl, thereby providing an effective means for cleaning the bowl. Additionally, while the functioning filter assembly of a multi-filter assembly filter controller is operating, the filter member of the non-functioning filter assembly may be repaired or replaced. After such repair or replacement of the filter member, the pump may be used to fill up the housing of the upper filter subassembly. This may be accomplished while the functioning filter assembly is in operation. Once so filled, the pump may be shut off via a valve control. Such fill of the housing allows the fuel to enter the filter member and prevents air from entering the filter member when the now functioning filter assembly replaces the use of the immediately preceding operating filter assembly.

The filter controller may further comprise an actuation subsystem which allows for either the manual or the automatic selection of fuel flow through one of the filter subsystems, or for the closing and/or opening of access to a particular filter subsystem. Such actuation subsystem may be formed on the manifold and includes a handle which is capable of blocking or closing the inlet, outlet and/or engine channels of the manifold.

The filter controller may further comprise one or both of a local annunciator or a remote annunciator, wherein either or both annunciators may respond to signals received from a water sensor or a pressure sensor incorporated within the filter controller. The annunciator(s), by at least one of visual, auditory, or vibrational means, can alert an operator that a change of a filter is recommended. Additionally or alternatively, the filter controller may be automated such that it can trigger a switch from one filter assembly to another filter assembly on its own. While the assembly of which the filter controller forms a part continues to operate, a malfunctioning filter may be repaired or replaced in a safe manner whereby spillage of remnant fluids may be decreased. In an exemplary embodiment, once so automated, the filter controller can alert an individual that servicing of the filter controller is advised. In this embodiment, the filter controller may include an auxiliary relay contact that can be used with an auto dial system or may be used as a signal for a computer input that can be programmed to call a technician via, e.g., a cell phone, satellite phone, the internet, and the like.

For the purposes of promoting understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated filter controller, and such further applications of the principles of the invention as illustrated therein being contemplated as would normally occur to one skilled in the art to which the invention relates.

Figure 5:
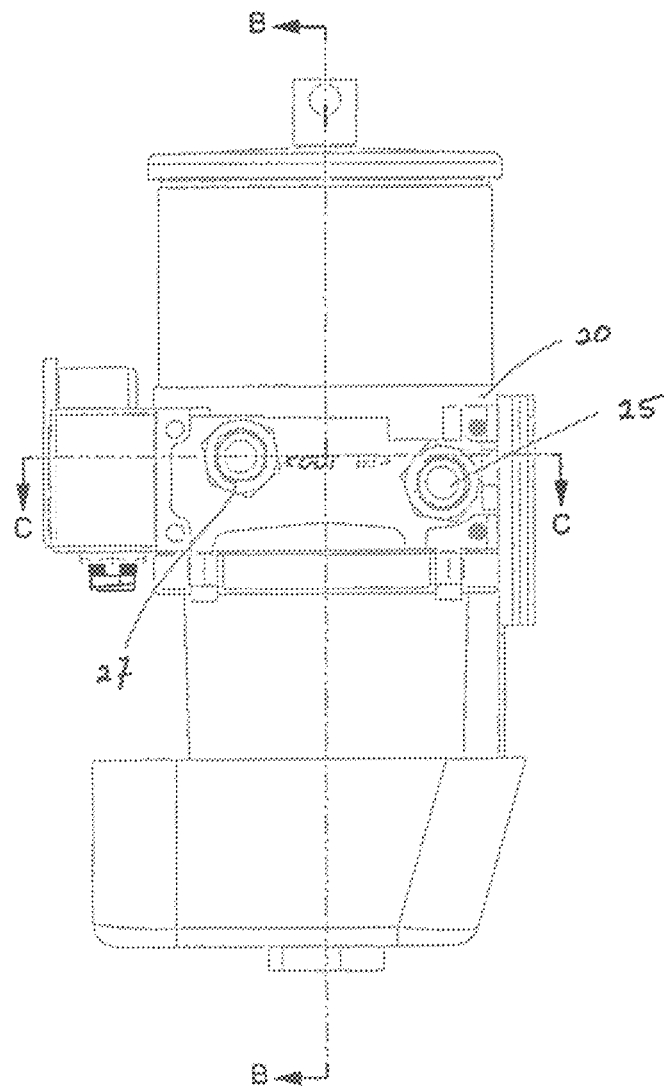
FIG. 5 is a schematic depicting a distal side view of the filter controller depicted in FIG. 1.
Figure 6:
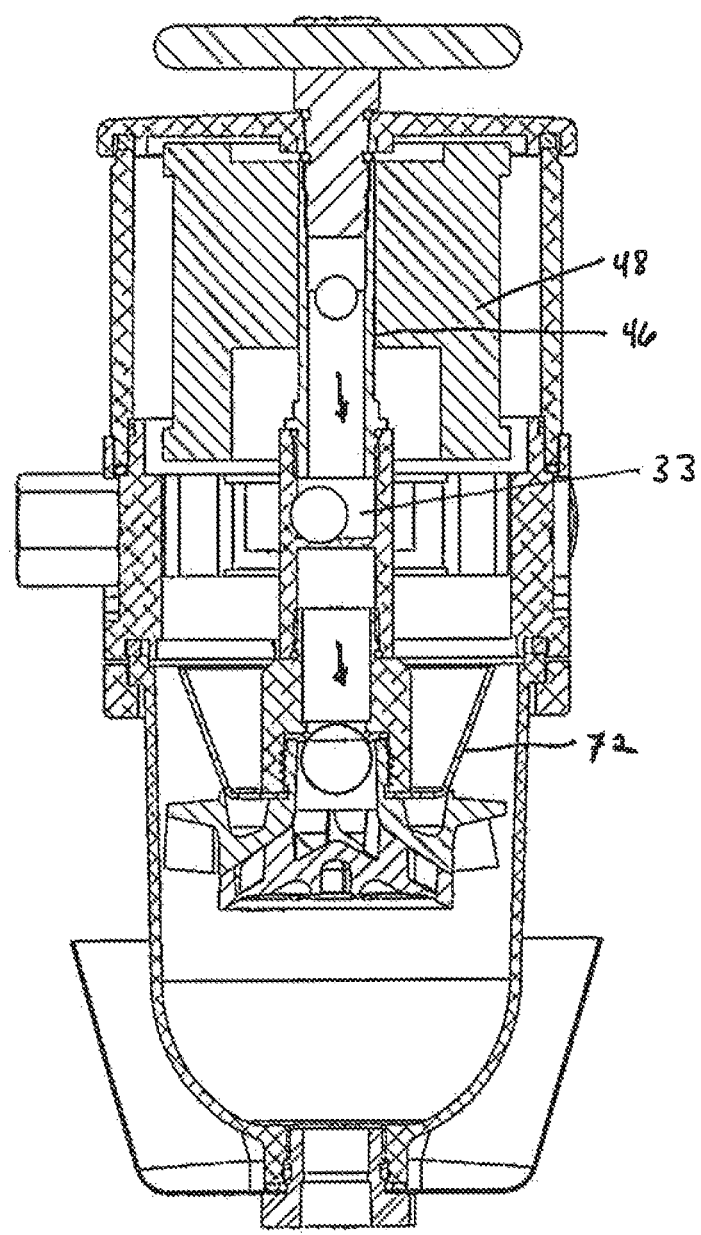
FIG. 6 is a schematic depicting a sectional view along line B-B of the filter controller as shown in FIG. 5.
Figure 7:
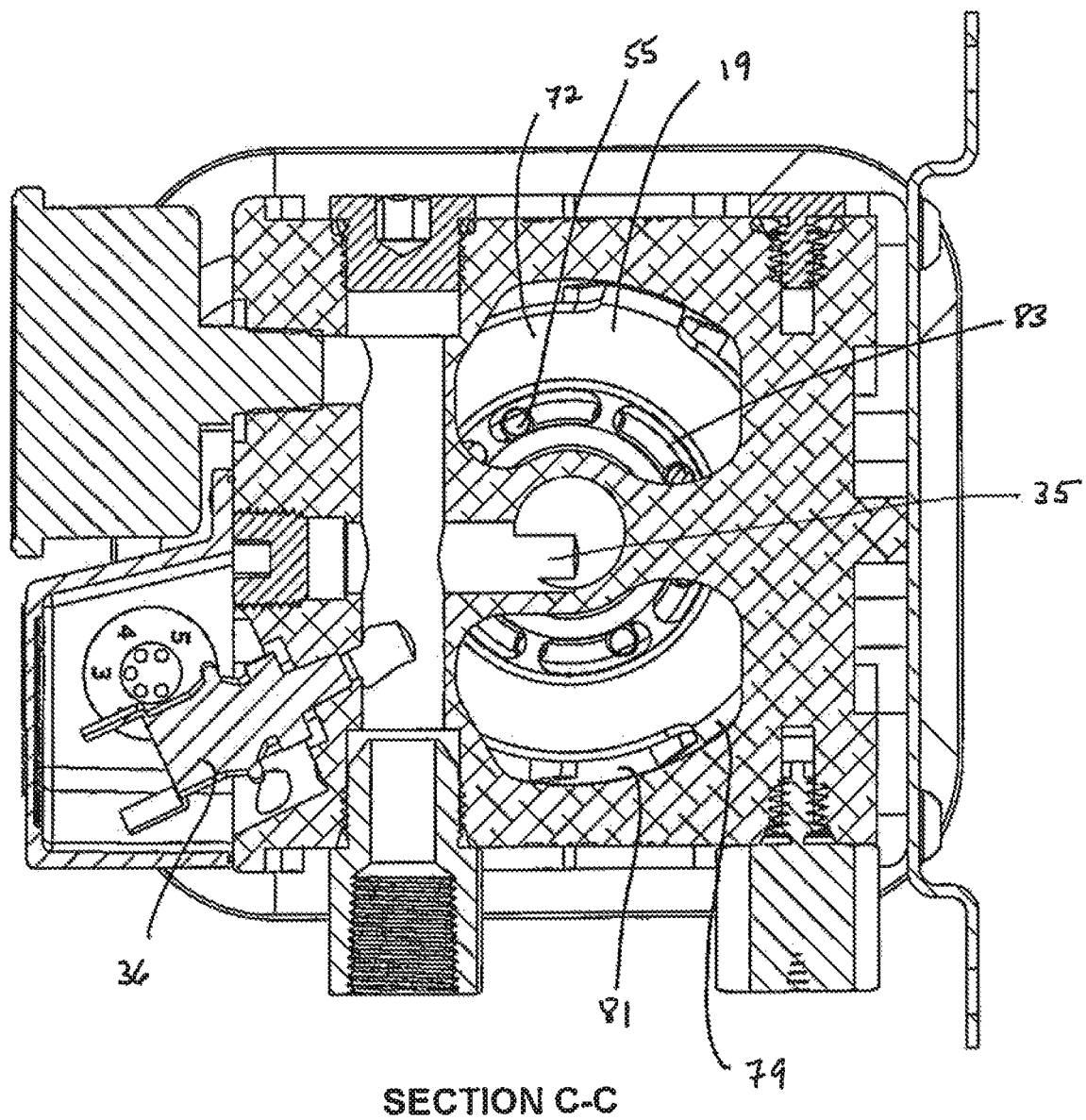
FIG. 7 is a schematic depicting a sectional view along line C-C of the filter controller as shown in FIG. 5.
Figure 8:
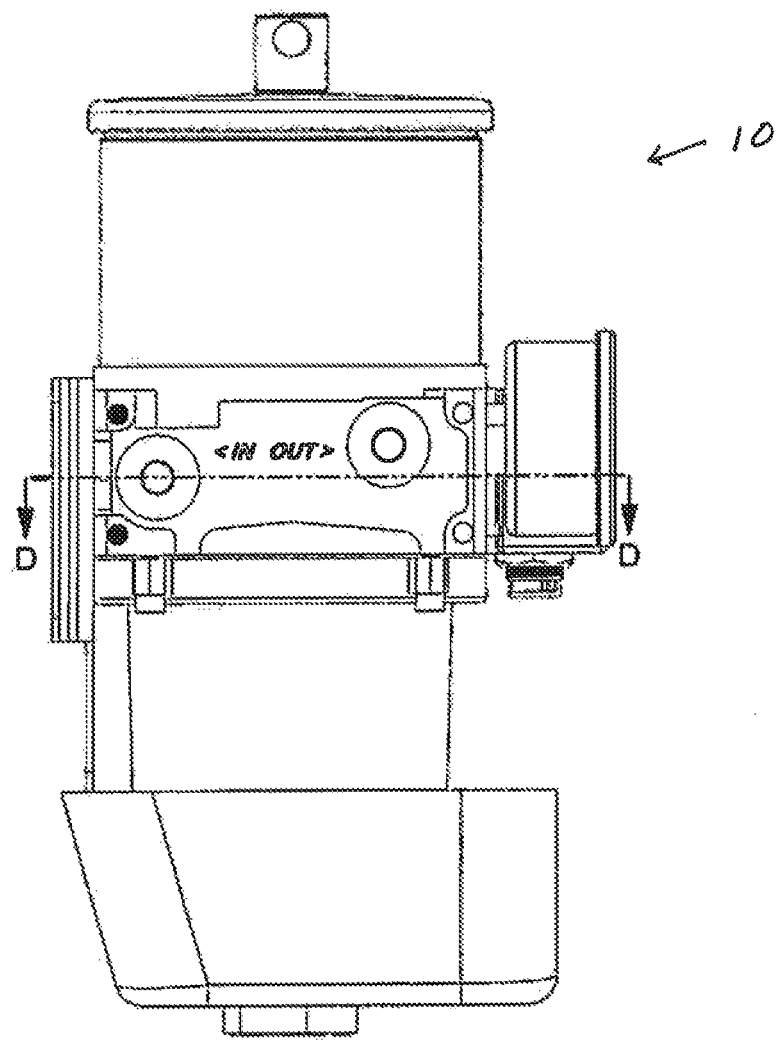
FIG. 8 is a schematic depicting a proximal side view of the filter controller depicted in FIG. 1.
Figure 9:
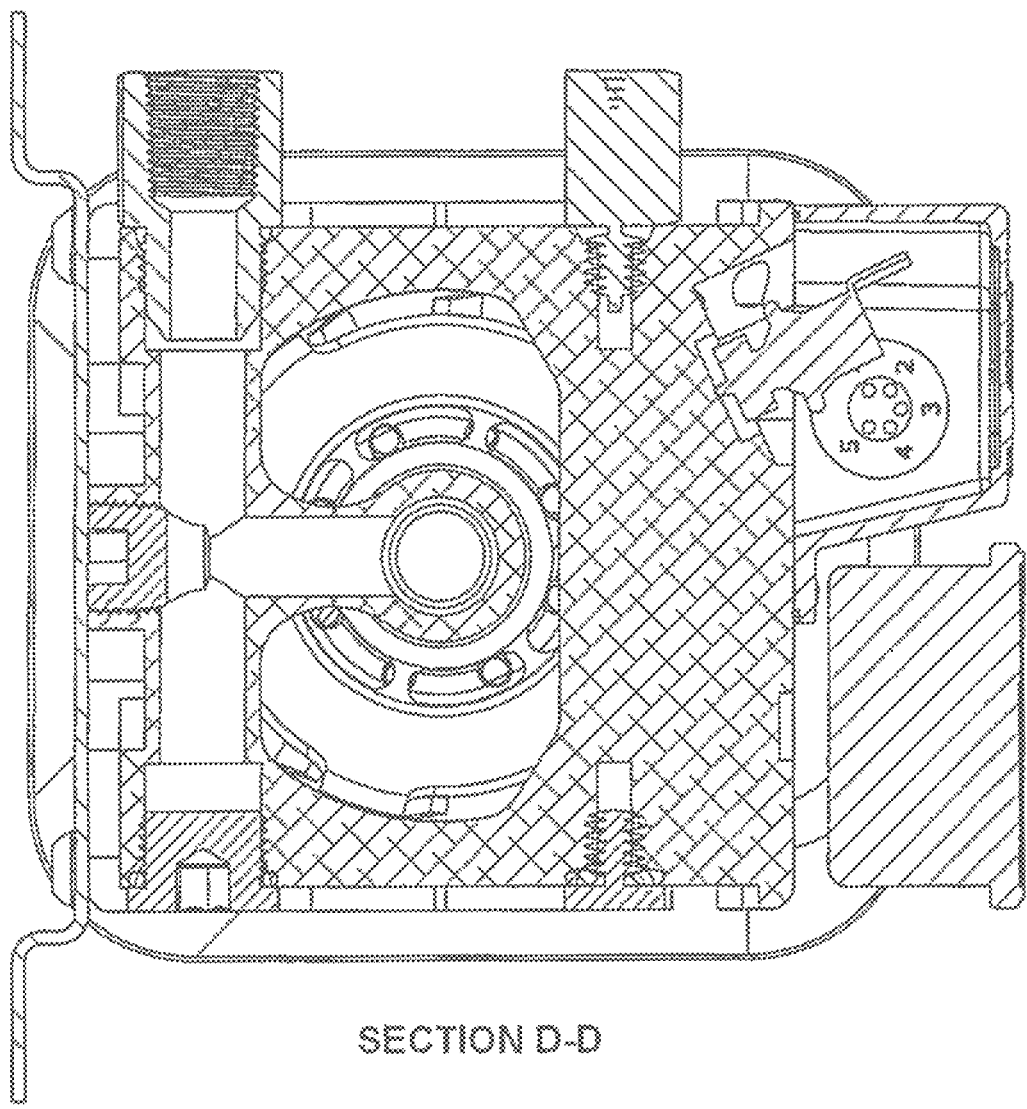
FIG. 9 is a schematic depicting a sectional view along line D-D of the filter controller as shown in FIG. 8.
Figure 10:
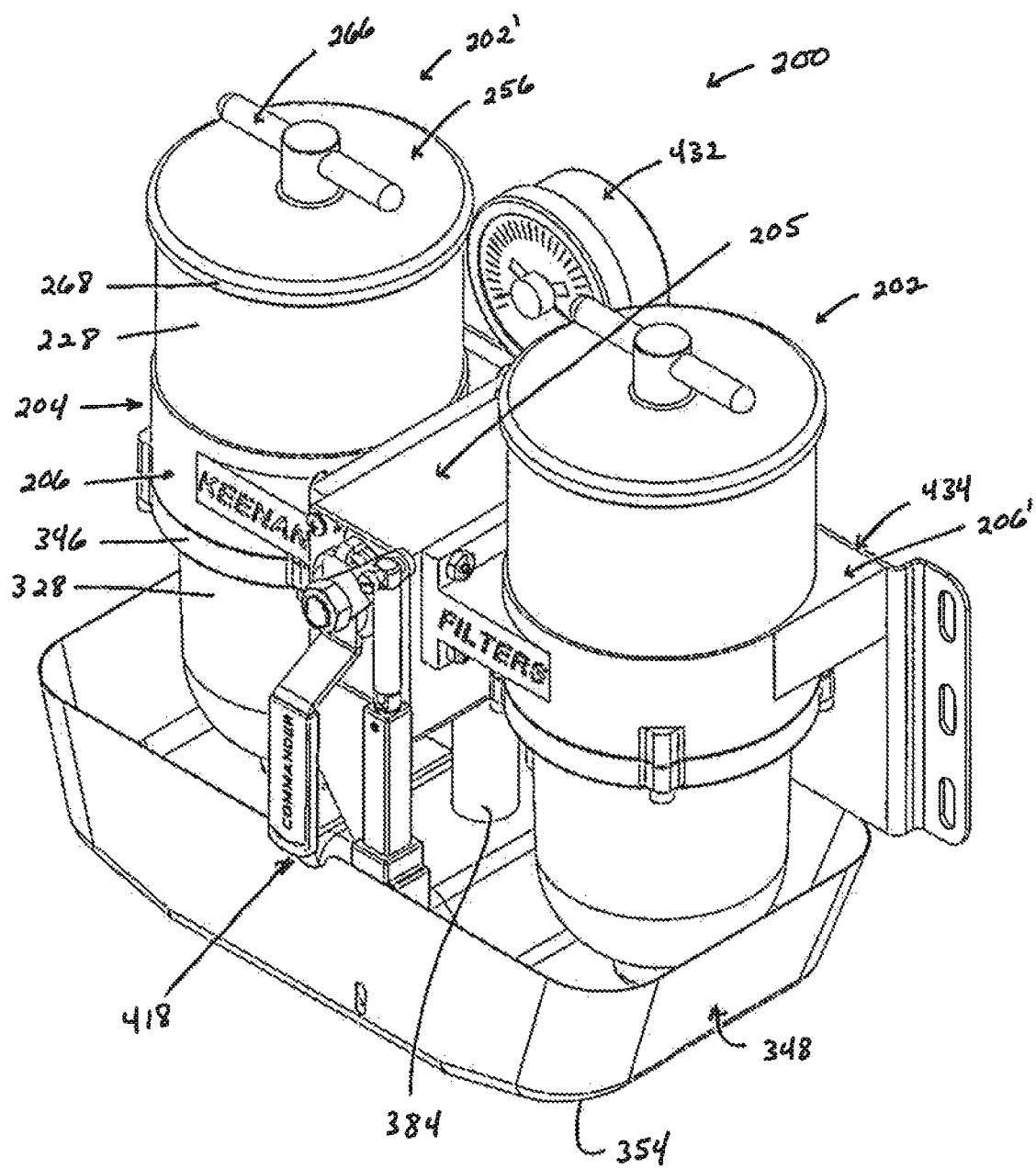
FIG. 10 is a schematic depicting an elevational view of another exemplary filter controller.
Figure 11:
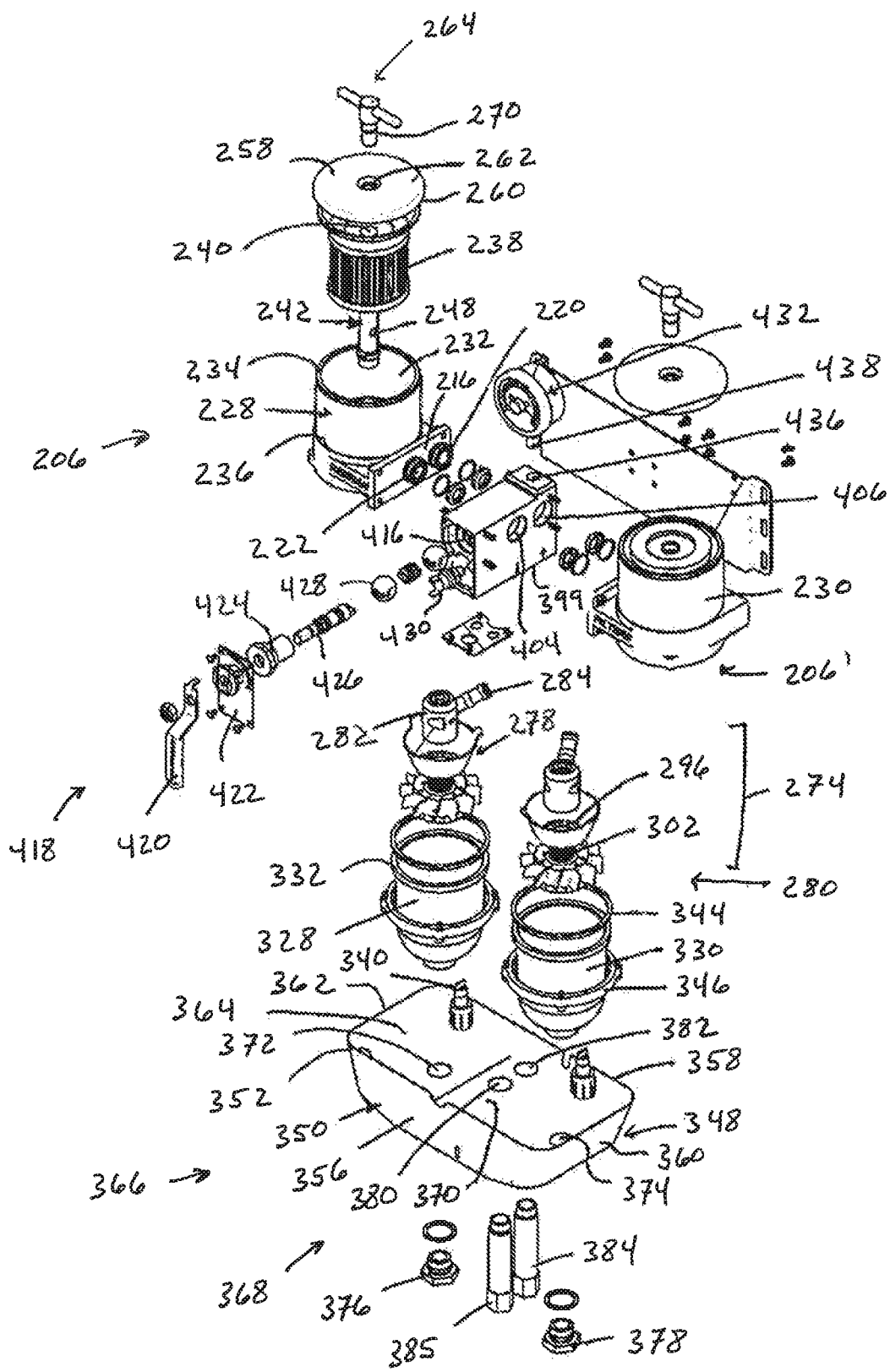
FIG. 11 is a schematic depicting an exploded view of the filter controller depicted in FIG. 10.
Figure 12:
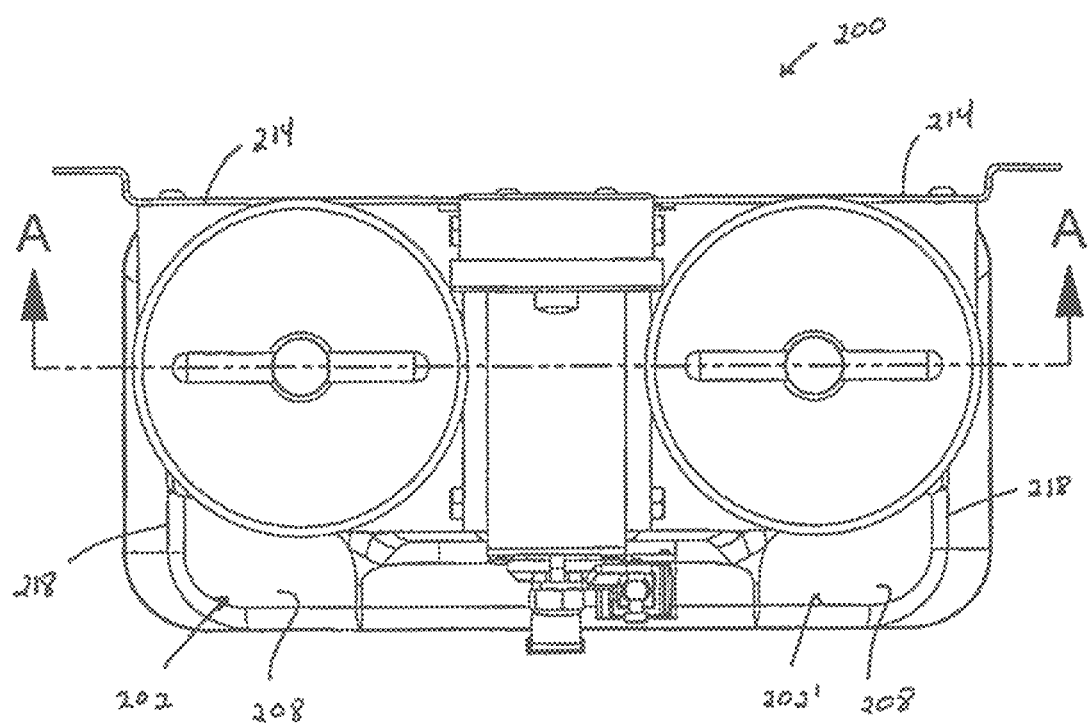
FIG. 12 is a schematic depicting a top side of the filter controller depicted in FIG. 11.
Figure 13:
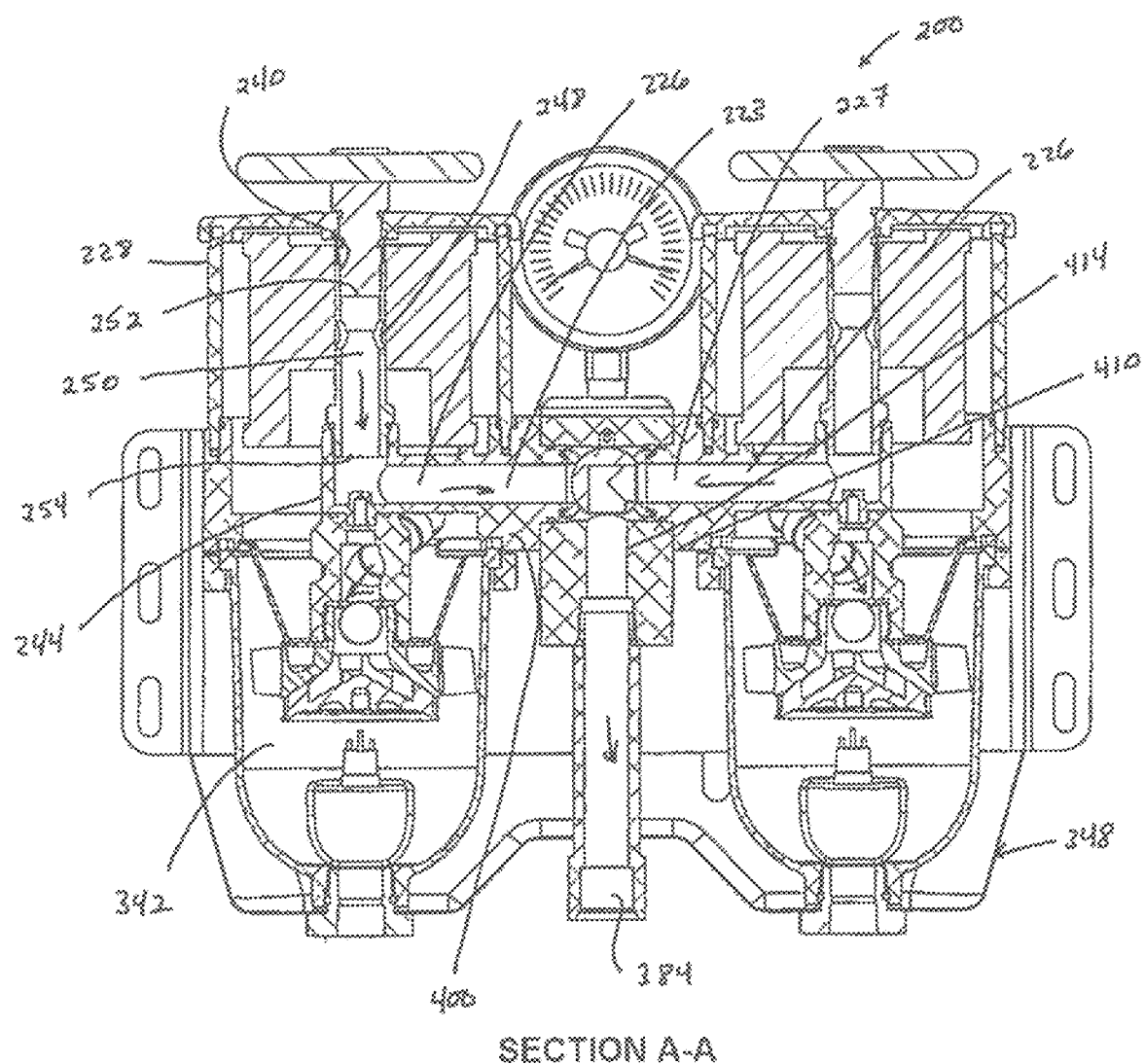
FIG. 13 is a schematic depicting a sectional view along line A-A of the filter controller as shown in FIG. 12.

Referring to FIGS. 1-9, an exemplary filter controller 10 comprises a manifold 12. Manifold 12 has a top side 14 oppositely situated to a bottom side 16, a proximal side 18 oppositely situated to a distal side 20, and an anterior side 22 oppositely situated to a posterior side 24, wherein proximal and distal sides 18 and 20 are arranged substantially perpendicularly to anterior and posterior sides 22 and 24, and wherein top and bottom sides 14 and 16 are arranged transverse to proximal, distal, anterior and posterior sides 18, 20, 22, and 24. As best shown in FIG. 7, an opening 19 is formed through top and bottom sides 14 and 16.

Figure 4:
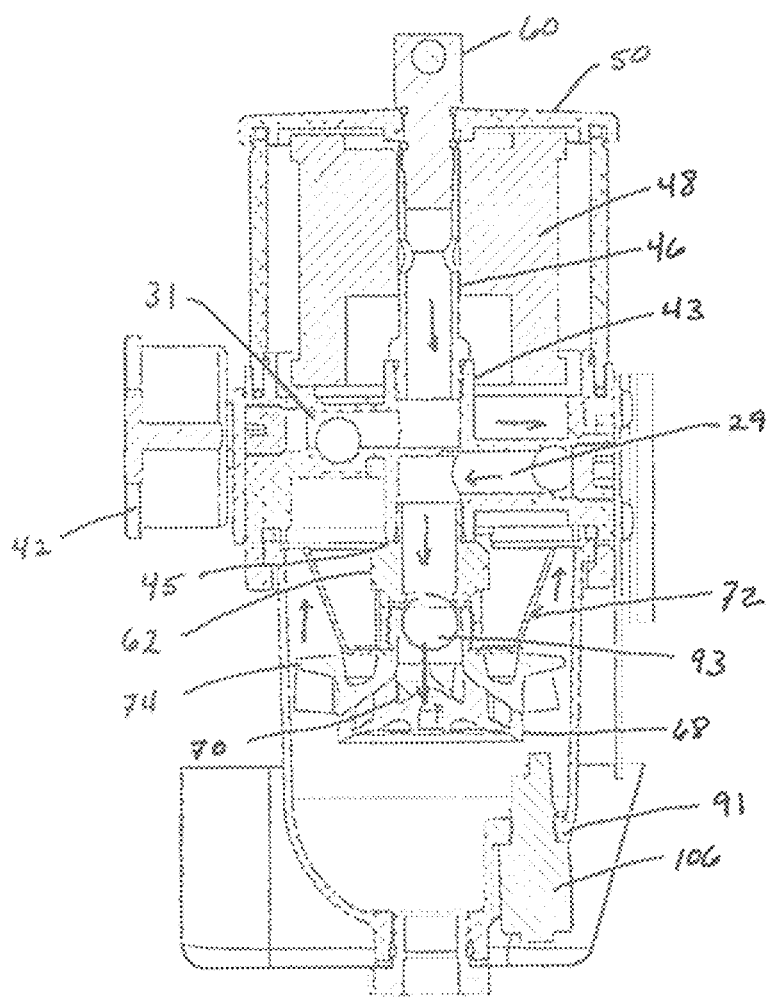
FIG. 4 is a schematic depicting a sectional view along line A-A of the filter controller as shown in FIG. 3.

As best shown in FIG. 1, an inlet port 26 and an outlet port 28 are formed through proximal side 18 of manifold 12, and, as best shown in FIG. 5, an inlet port 25 and an outlet port 27 are formed through distal side 20 of manifold 12. As best shown in FIG. 4, an inlet channel 29 is formed within manifold 12 and is in fluid communication with inlet port 26, and an outlet channel 31 is formed within manifold 12 and is fluid communication with outlet port 28. Additionally, an outlet channel 33 is formed within manifold 12 and is in fluid communication with outlet port 27, and an inlet channel 35 is formed within manifold 12 and is in fluid communication with inlet port 25.

Figure 2:
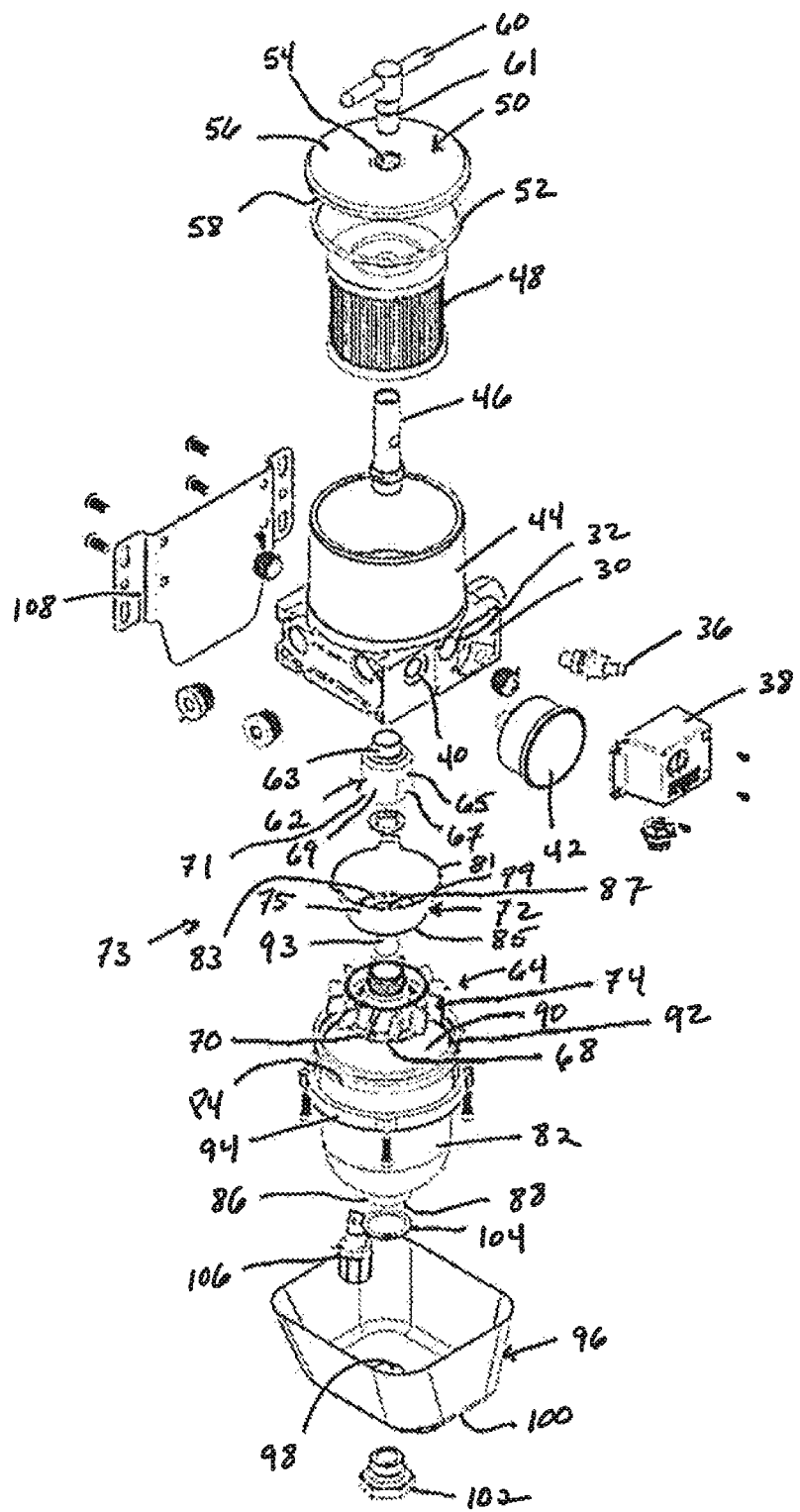
FIG. 2 is a schematic depicting an exploded view of the filter controller depicted in FIG. 1.
Figure 3:
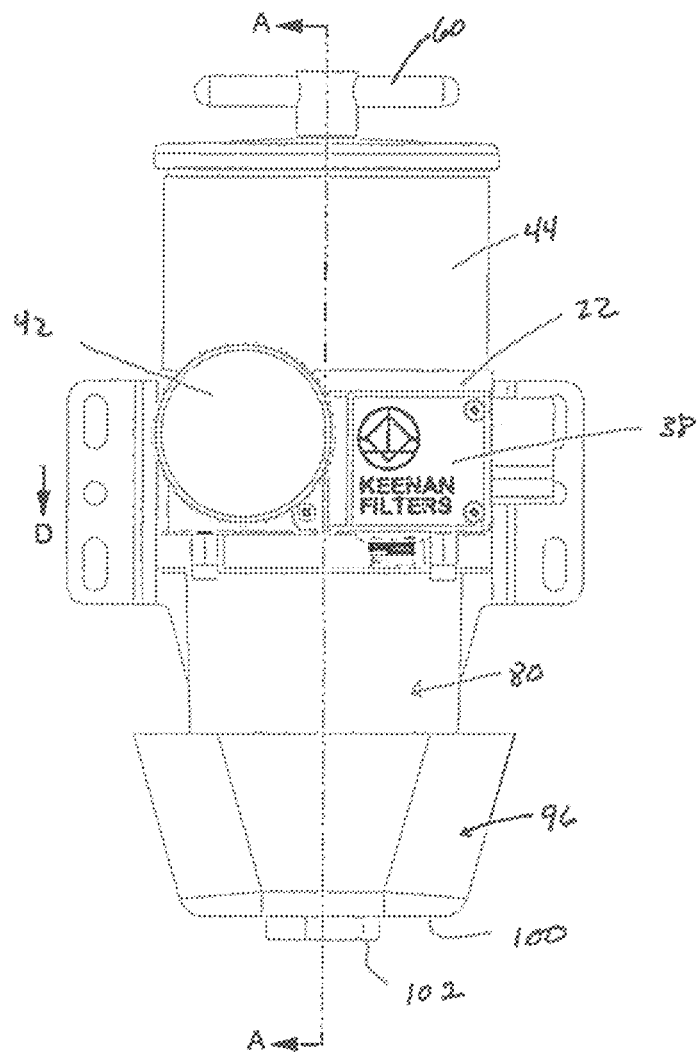
FIG. 3 is a schematic depicting an anterior side view of the filter controller depicted in FIG. 1.

As best shown in FIG. 2, a window 30 is formed through anterior side 22 of manifold 12. Window 30 leads into a port 32 formed through manifold 12. A vacuum pressure sensor 36 is received within port 32, while a sensor cover 38 is bolted over window 30 to thereby protectively secure sensor 36 to manifold 12. A pressure gauge port 40 is formed through anterior side 22 and is located adjacent to window 30. A pressure gauge 42 is received by pressure gauge port 36, and is in fluid communication with vacuum pressure sensor 36.

As best shown in FIG. 1, top side 14 of manifold 12 is configured to securely hold a housing 44, wherein housing 44 has a generally cylindrical shaped body. As shown, e.g., in FIGS. 2 and 4, a receiver member 43 is centrally formed on top side 14 of manifold 12, wherein receiver member 43 receives and holds a filter tube 46. A generally cylindrical shaped filter element 48 is centrally disposed around filter tube 46. A lid 50 having a lid seal 52 disposed around an outer perimeter of lid 50 is positioned on a top side 54 of housing 44. Lid 50 has an opening 54 centrally formed through top side and bottom sides 56 and 58 thereof. A tee-shaped retainer 60 is disposed through opening 54 and, through a clockwise motion or a counterclockwise motion, is used to respectively tighten lid 50 onto housing 44 or to loosen lid 50 from housing 44. Additionally, lid retainer 60 has an o-ring 61 disposed thereon, wherein o-ring 61 seals opening 54 thereby separating the dirty fuel chamber from the clean side of filter tube 46.

Fuel controller 10 further comprises a contaminant separating assembly 73. Assembly 73 includes a stem member 62, a diffuser cone 72, a fuel stator 64, and a ball float 93. Stem member 62 has a generally cylindrically shaped neck portion 63 that is centrally formed with a generally cylindrically shaped body portion 65, wherein neck portion 63 is recessed relative to body portion 65. Neck portion 63 is received within an opening 45 (see FIG. 4) of bottom side 16 of manifold 12. Body portion 65 has an opening 67 formed through a side wall 69 thereof, wherein opening 67, via a channel formed through body portion 65, is in fluid communication with an open-ended bottom side 71 of body portion 65.

Diffuser cone 72 has a generally frusto-conical shaped body 75. A series of flanges 79 are radially arranged on a top side 77 of body 75, wherein a gap 81 is formed between adjacently situated flanges 79. A series of exit holes 83 is formed through a bottom side 85 of diffuser cone 72. Bottom side 85 of diffuser cone 72 further has an opening 87 centrally formed therethrough.

Fuel stator 64 comprises an open-ended engagement member 66 which is received through opening 87 of diffuser cone 72 and which is further engaged with stem member 62. Fuel stator 64 further comprises a generally cylindrically shaped body 68 which is contiguously formed with engagement member 66 and upon which is radially disposed a plurality of vanes 70. An upwelling hole 55 is formed through each vane of plurality 70. Fuel stator 64 further comprises a ring of radially disposed vanes 74 positioned over plurality of vanes 70.

Ball float 93 of assembly 73 is disposed within a chamber 76 formed through engagement member 66.

Referring to the figures, controller system 10 further comprises a bowl 80. Bowl 80 has a generally cylindrical shaped body 82 having an open ended top side 84 oppositely situated to a bottom side 86, wherein bottom side 86 has an opening 88 centrally formed therein. A chamber 90 is surrounded by body 82 and is in fluid communication with open ended top side 84 and with opening 88. Contaminant separating assembly 73 is contained within chamber 90, and top side 84, which has a bowl seal 92 disposed around a perimeter thereof, abuts bottom side 16 of manifold 12. Bowl 80 further comprises an opening 91 (see FIG. 4) formed near bottom side 86, wherein a water sensor 106 is disposed within and secured to opening 91.

A bowl retainer 94 is disposed around body 82 and serves to strengthen the integrity of bowl 80. A heat shield 96, having a hole 98 formed through a bottom side 100 thereof, is directed towards bottom side 86 of bowl 80 such that opening 88 is centrally aligned with hole 98. A drain 102, which is directed towards bottom side 100 of heat shield 96, is received within hole 98, while a washer 104 is directed towards an opposite side of bottom side 100 of heat shield 96, wherein drain 102 and washer 104 are used to secure heat shield 96 to bowl 80, and further wherein drain 102 provides an outlet for water and contaminant particles. It is noted herein that heat shield 96 is configured to receive and to hold fluid emitted through bowl 80.

Referring to FIG. 1, filter controller 10 may further comprise a mount/heat shield 108 which is mounted directly to posterior side 24 of manifold 12 via a plurality screws 110.

Referring to FIGS. 4 and 6, a pressurized fluid, such as, e.g., fuel, gasoline, and the like, either enters inlet port 26 and flows through inlet channel 29 or enters inlet port 25 and flows through inlet channel 35 (depending on which inlet port the fluid is flowing through, the other inlet port may be closed off). The fluid then flows through stem 62 where it then enters contaminant separating assembly 73. The fluid flows through upwelling holes 55 and then moves over vanes 74 and 70. Vanes 74 and 70 create a centrifugal force which causes the fuel to rotate. Such rotation separates out contaminants and water from the fluid which move to the bottom of bowl 80 and which can exit bowl 80 via drain 102. The fluid then flows through gaps 81 formed in diffuser cone 72 and moves through filter element 48. The fluid then flows into and through filter tube 46 where it exits filter tube 46 via an opening 39 formed on filter tube 46 and which is in fluid communication with outlet channels 31 and 33. The fluid then flows from either outlet channel 31 into outlet port 28 or through outlet channel 33 into outlet port 27 (depending on which outlet channel the fuel is entering, the other outlet channel and corresponding outlet port may be closed off), where the now filtered fuel can flow towards its end destination.

It is noted that in an exemplary embodiment, filter tube 46 may include a length that can accommodate multiple filter elements 46, wherein in a particularly preferred embodiment, up to about three filter elements may be stacked vertically, one on top of the other, each disposed around filter tube 46.

Another exemplary filter controller is depicted in FIGS. 10-21. Here, a filter controller 200 comprises a first filter assembly 202, a second filter assembly 202', and a manifold subassembly 204. Manifold subassembly 204 comprises a first flow housing 206, a second flow housing 206', and a directional flow housing 205. First flow housing 206 and second flow housing 206' are substantially identical to one another. Therefore, for the sake of clarity, a description shall be made with reference to first flow housing 206, wherein it is to be understood, unless expressly stated otherwise herein, that the description provided for first flow housing 206 applies equally to second flow housing 206'. Additionally, the first filter assembly 202 and the second filter assembly 202' are substantially identical to one another. Accordingly, to ease the legibility of the figures, the following description shall specifically refer to first filter assembly 202, wherein it is to be understood that the disclosure relates equally to second filter assembly 202' unless specifically stated herein as otherwise.

First flow housing 206 has a top side 208 oppositely situated to a bottom side 210, wherein an opening is formed between top and bottom sides 208 and 210 such that top and bottom sides 208 and 210 are in fluid communication with one another. First flow housing 206 further comprises a proximal side 212 oppositely situated to a distal side 214, and an anterior side 216 oppositely situated to a posterior side 218. Anterior side 216 has an inlet port 220 and an outlet port 222 formed thereon. Inlet port 220 leads into an inlet channel 224 formed within first flow housing 206, and outlet port 222 leads into an outlet channel 226 formed within first flow housing 206.

First filter assembly 202 comprises a first element housing 228. Housing 228 comprises a generally open-ended cylindrical shaped body 230, wherein body 230 has a chamber 232 centrally formed through an open-ended top side 234 and an open ended-bottom side 236 thereof. First filter assembly 202 further comprises a filter member 238. Filter member 238 comprises a generally cylindrically shaped body having a channel 240 centrally formed therethrough.

A filter tube 242 has a generally cylindrical shaped body 246. Body 246 of filter tube 242 has a top side 252 and an oppositely situated open-ended bottom side 254 and a hollow interior 250 that is in fluid communication with the top and bottom sides of body 246 and with an opening 248 formed on body 246. Filter tube 242 is disposed within chamber 232 such that body 246 is surrounded by filter member 238, and bottom side 254 is received by and held within a receiving member 244 centrally positioned on top side 208 of first flow housing 206.

In an exemplary embodiment, filter tube 242 may include a length that can accommodate multiple filter members 238, wherein in a particularly preferred embodiment, up to about three filter members may be stacked vertically, one on top of the other, each disposed around filter tube 242.

First filter assembly 202 further comprises a lid 256 having a top side 258 oppositely situated to a bottom side 260, and having a channel 262 centrally formed through top and bottom sides 258 and 260. A longitudinally extending body 266 of a tee-shaped handle 264 is disposed within channel 262 of lid 256 and extends into channel 240 of filter member 238, thereby securing lid 256 onto housing 228. Tee-shaped handle 264 comprises an o-ring 270 that seals chamber 232 of housing 228 to thereby separate fuel chamber 232 from lid 256. A seal 268 is disposed on top side 234 of housing 228 to thereby conceal and contain filter member 238 within housing 228.

First filter assembly 202 further comprises a contaminant separating assembly 274. Contaminant separating assembly 274 comprises an intake subassembly 276, a diffuser cone 278, and a stator subassembly 280.

Intake subassembly 276 comprises a generally cylindrically shaped base member 282 having a hollow interior 283 that leads into an open-ended bottom side. Bottom side 210 of first flow housing 206 has an opening 272 centrally formed thereon, wherein opening 272 is configured to receive and hold a top side of base member 282 of intake subassembly 276.

Figure 22:
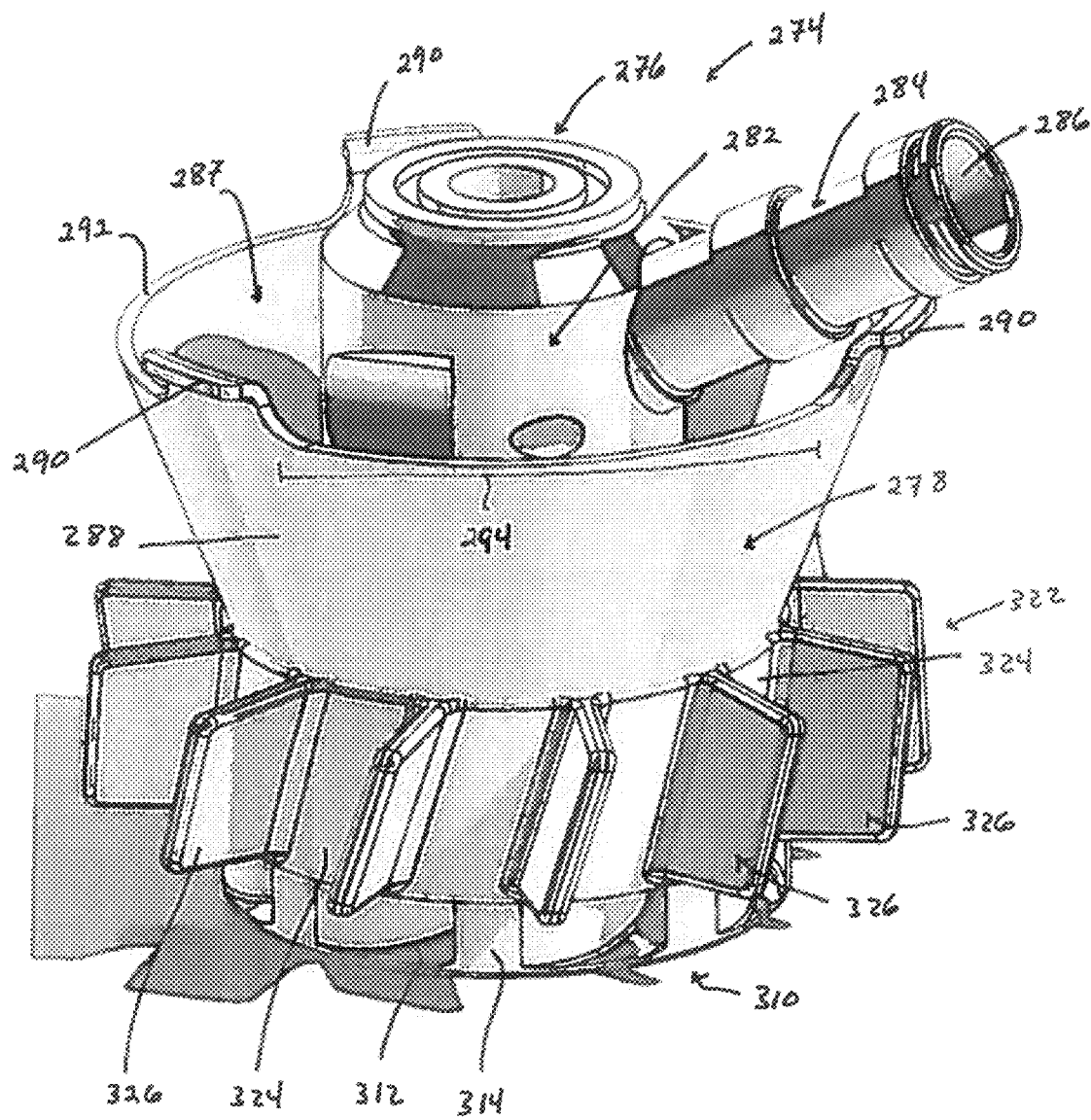
FIG. 22 is a schematic depicting an exemplary contaminant separating assembly.
Figure 23:
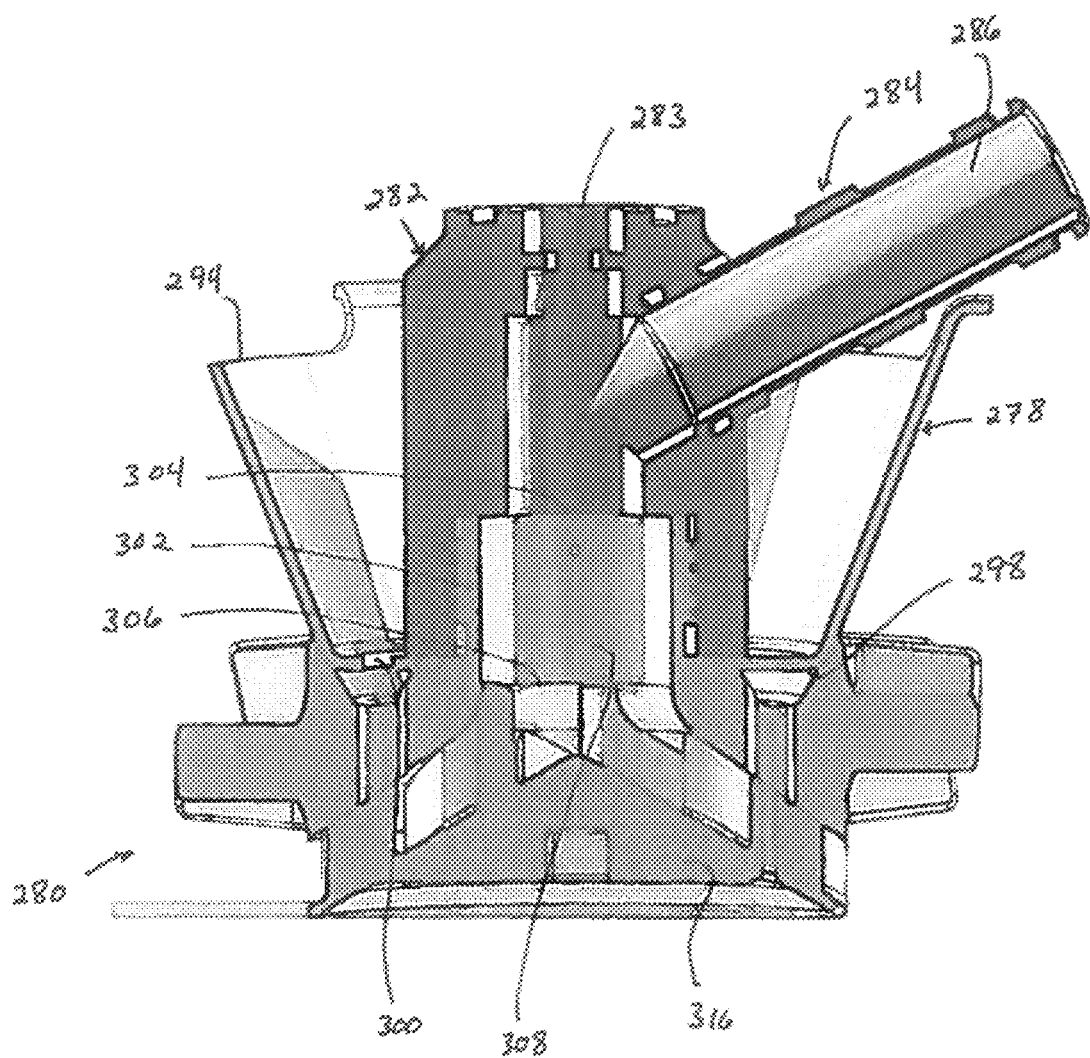
FIG. 23 is a schematic depicting a longitudinal sectional view of the contaminant separating assembly depicted in FIG. 22.
Figure 24:
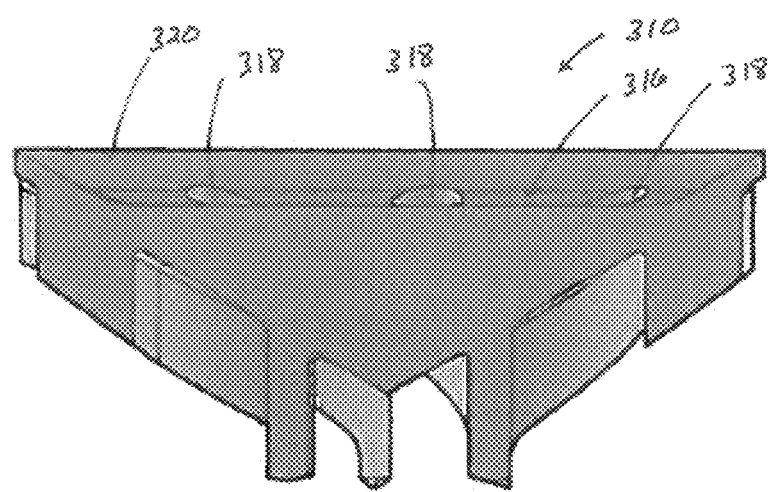
FIG. 24 is a schematic depicting an exemplary vaned member of the contaminant separating assembly depicted in FIG. 22.
Figure 25:
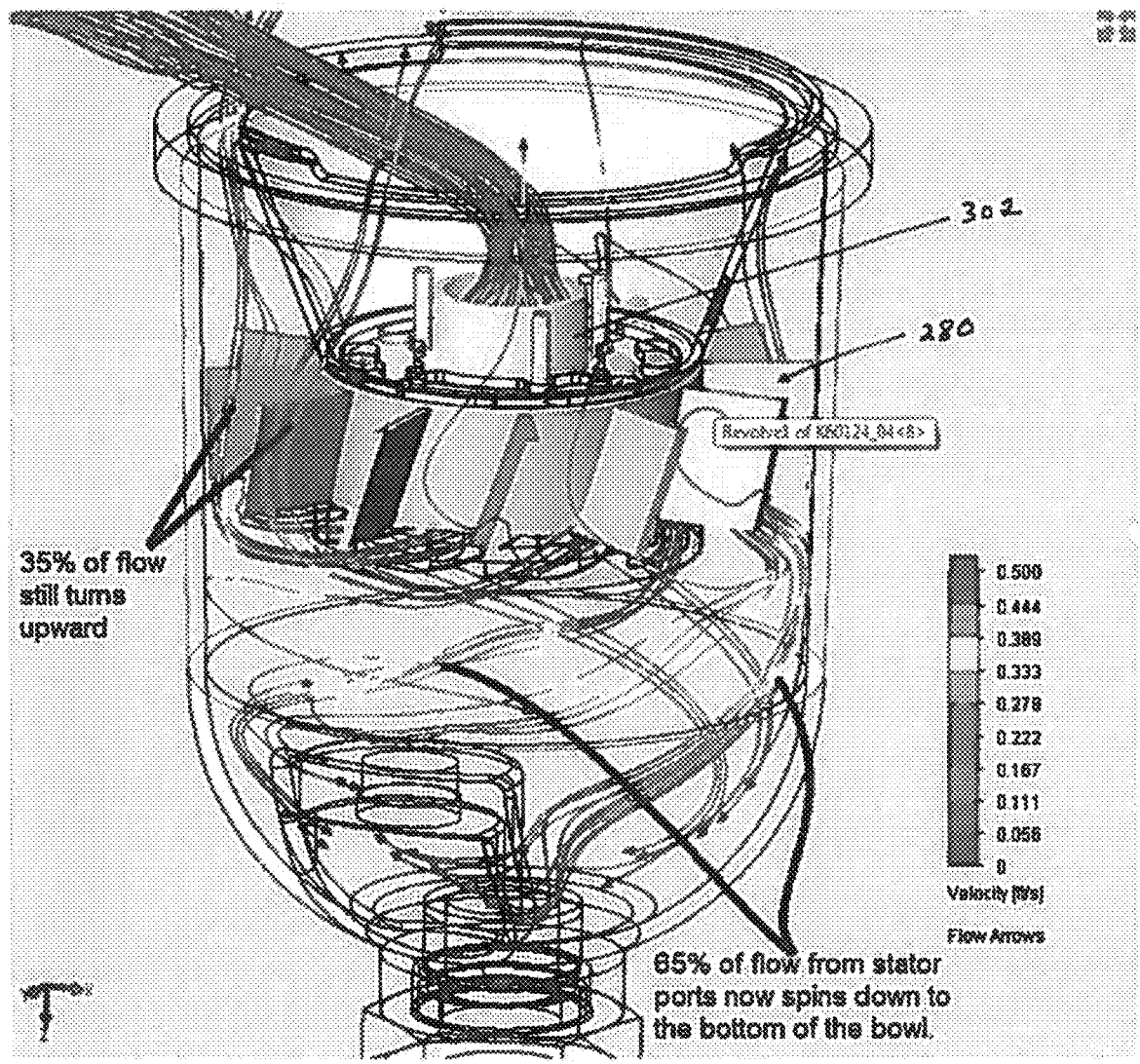
FIG. 25 is a schematic depicting an exemplary arrangement of a portion of the contaminant separating assembly depicted in FIG. 22 within an exemplary bowl, and further showing the flow of a fluid.
Figure 26:
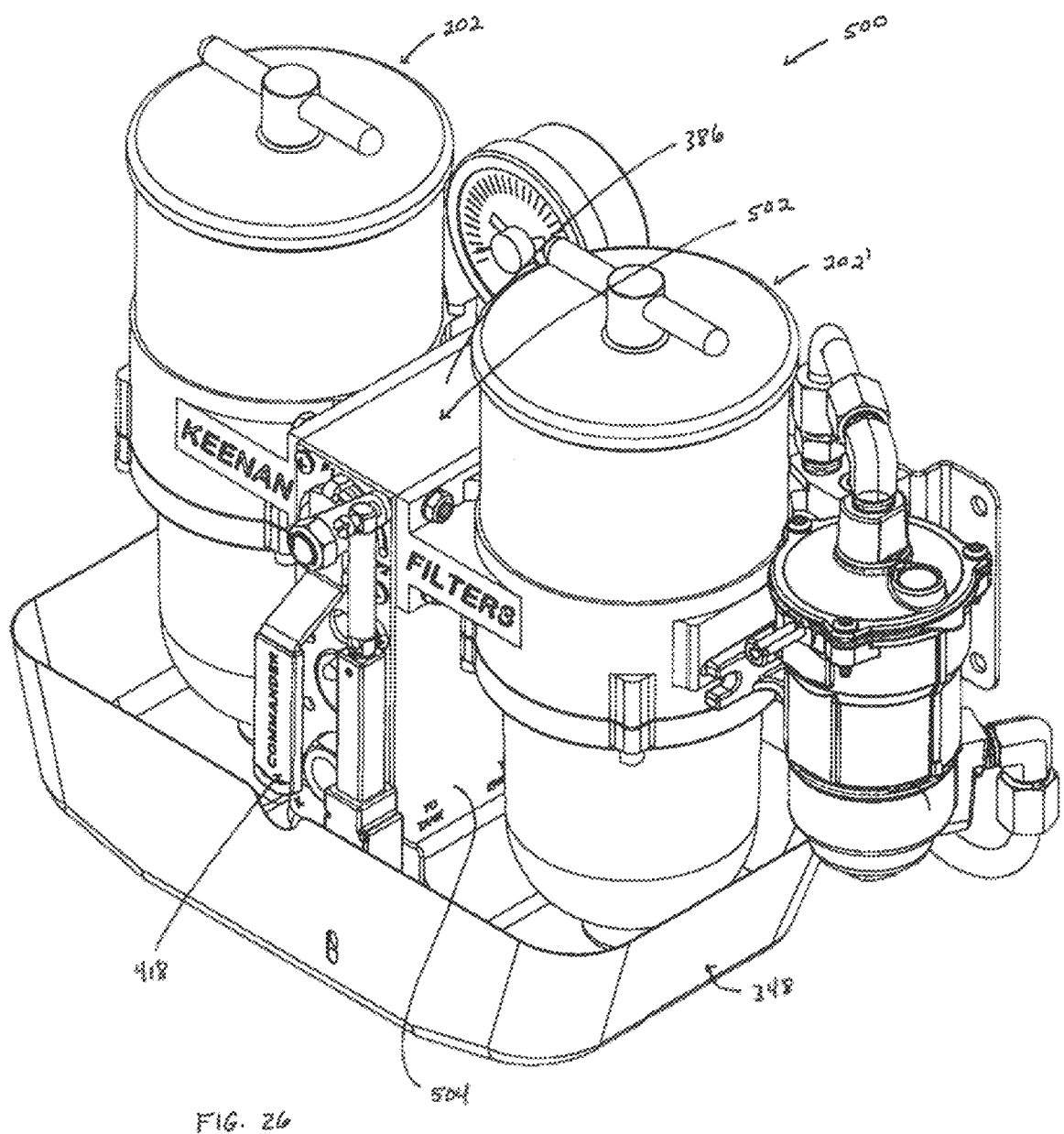
FIG. 26 is a schematic depicting an elevational right-sided view of another exemplary filter controller.
Figure 27:
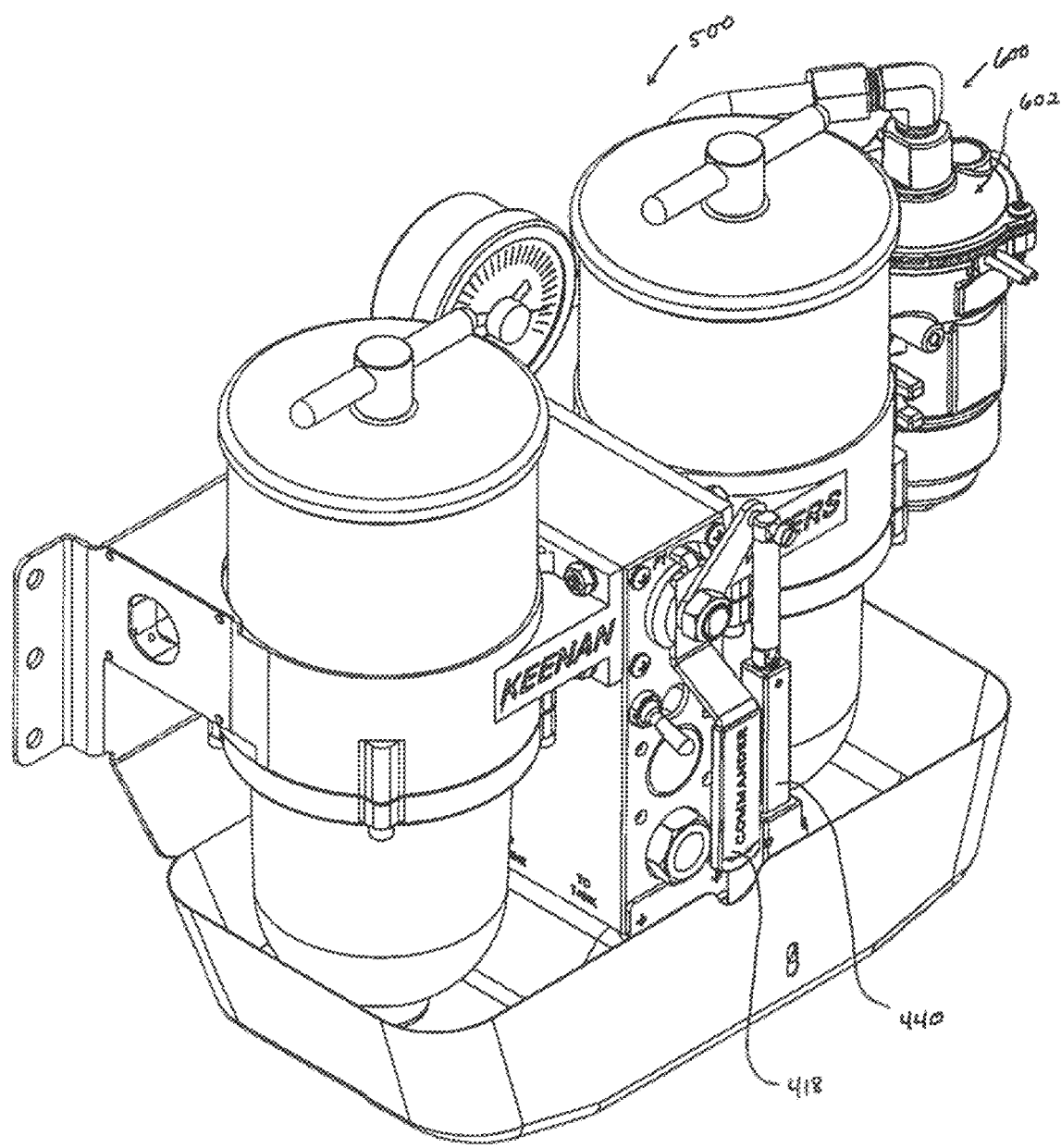
FIG. 27 is a schematic depicting an elevational left-sided view of the filter controller depicted in FIG. 26.
Figure 28:
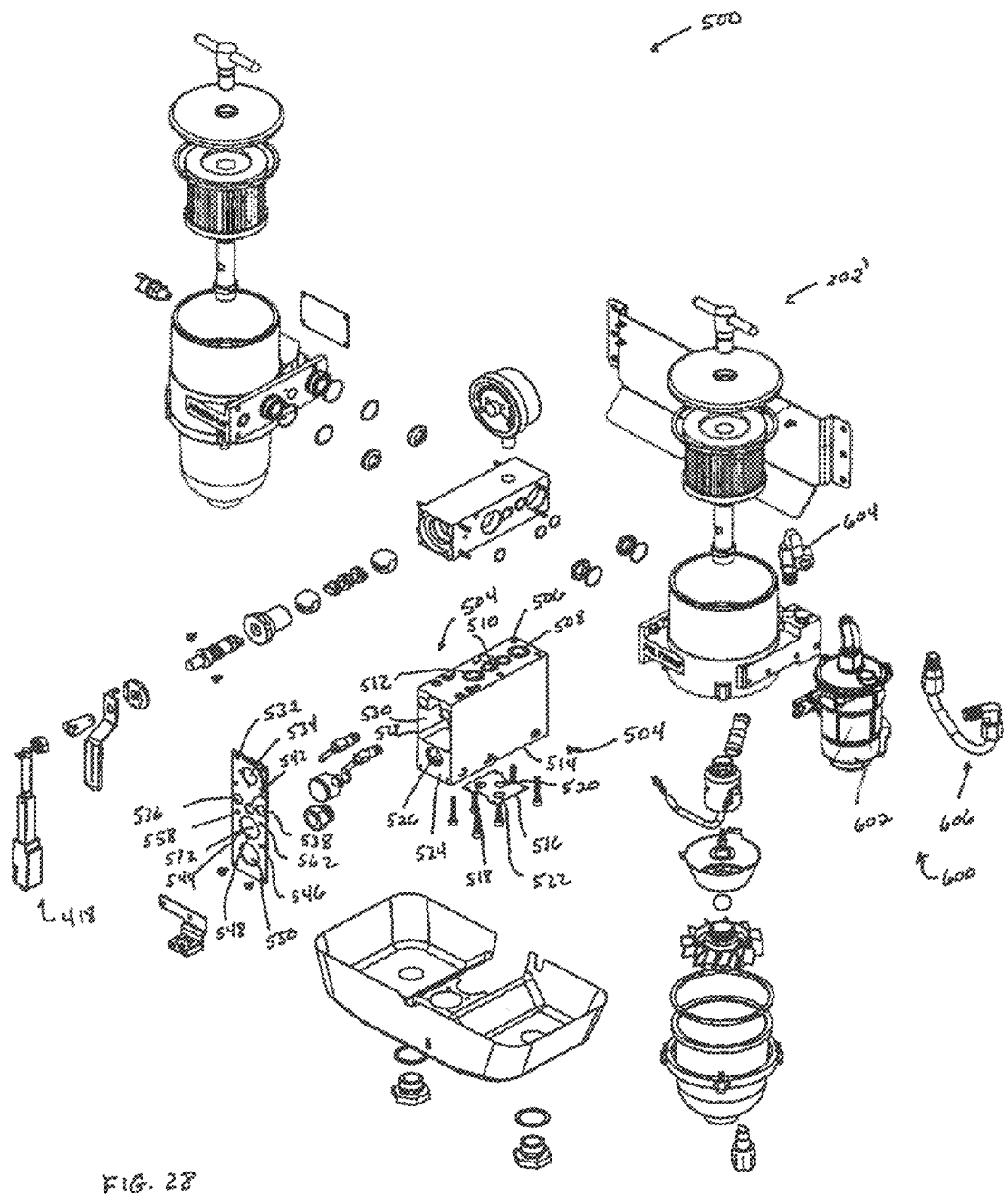
FIG. 28 is a schematic depicting an exploded view of the filter controller depicted in FIGS. 26 and 27.
Figure 29:
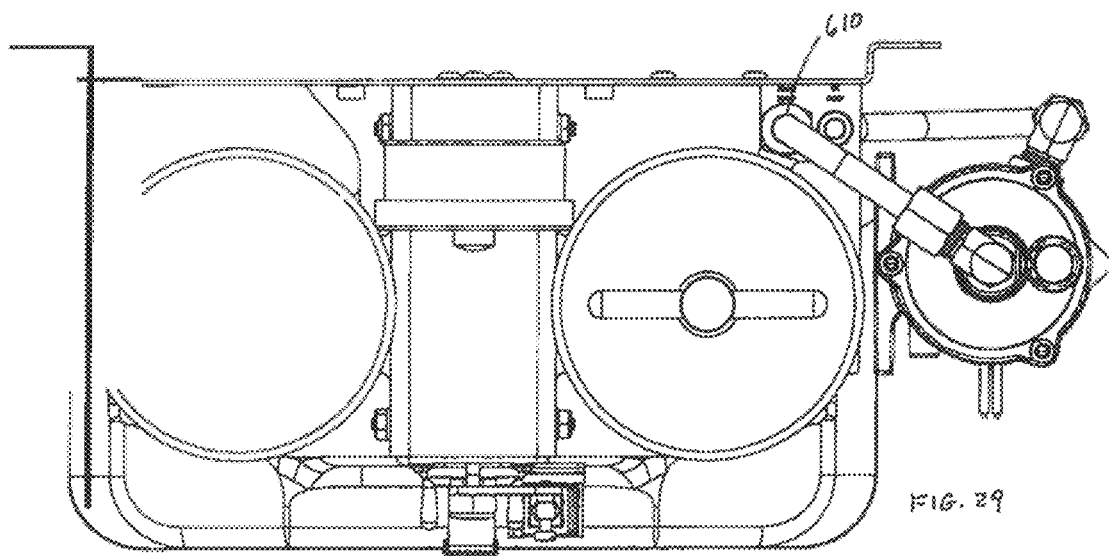
FIG. 29 is a schematic depicting a top side view of the filter controller depicted in FIGS. 26 and 27.
Figure 30:
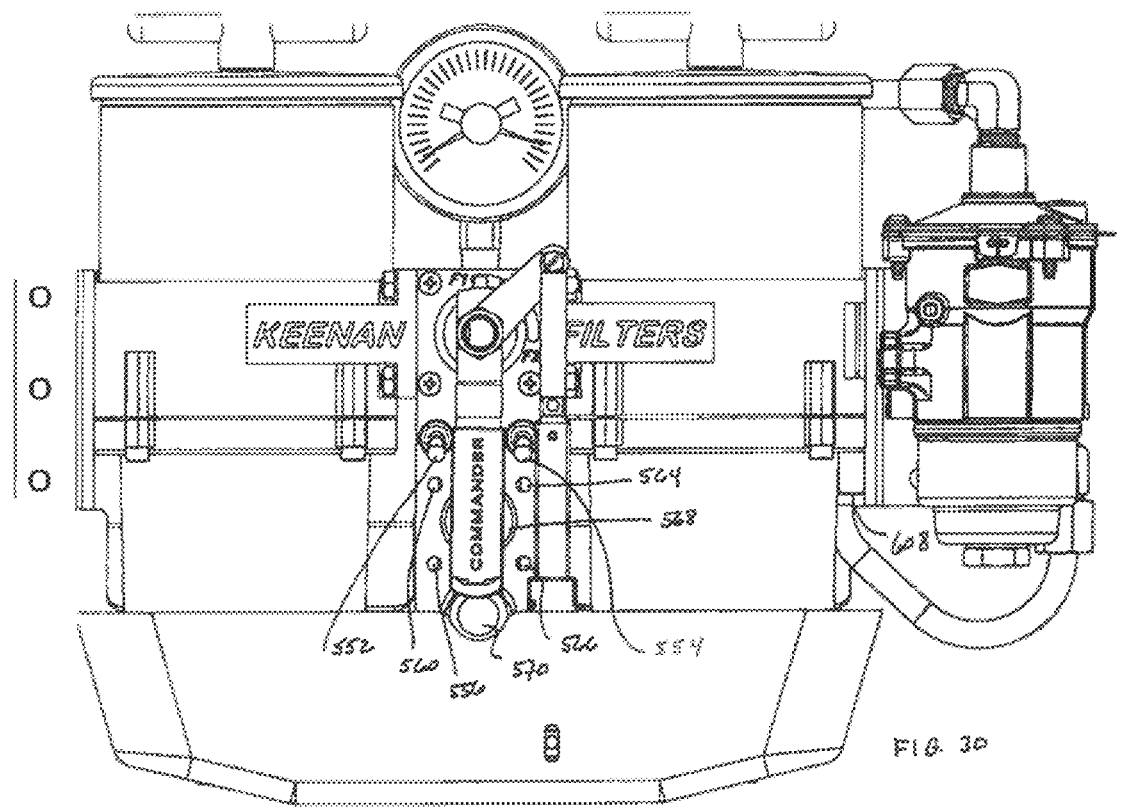
FIG. 30 is a schematic depicting a front side view of the filter controller depicted in FIGS. 26 and 27.
Figure 31:
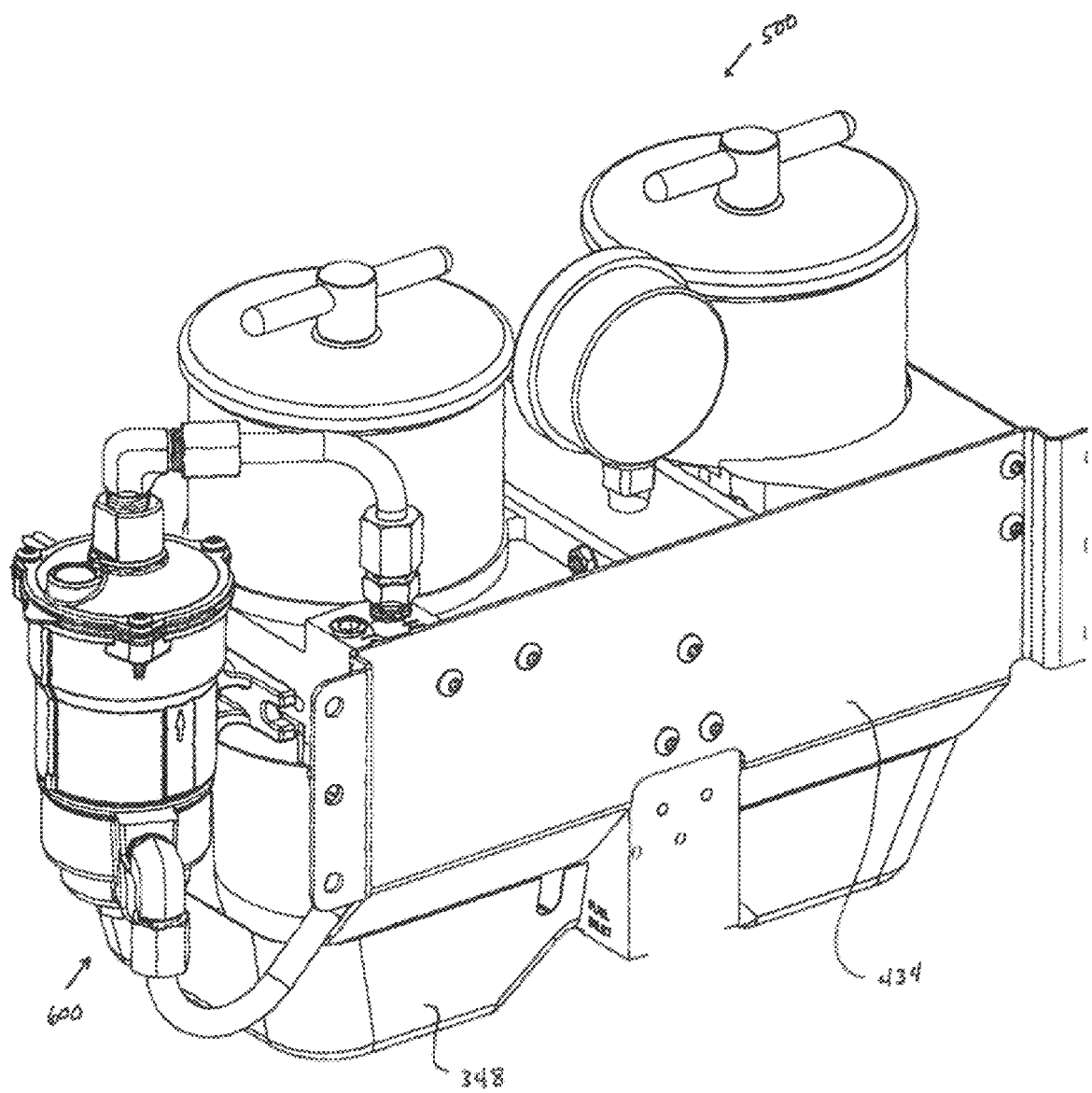
FIG. 31 is a schematic depicting a back side view of the filter controller depicted in FIGS. 26 and 27.
Figure 32:
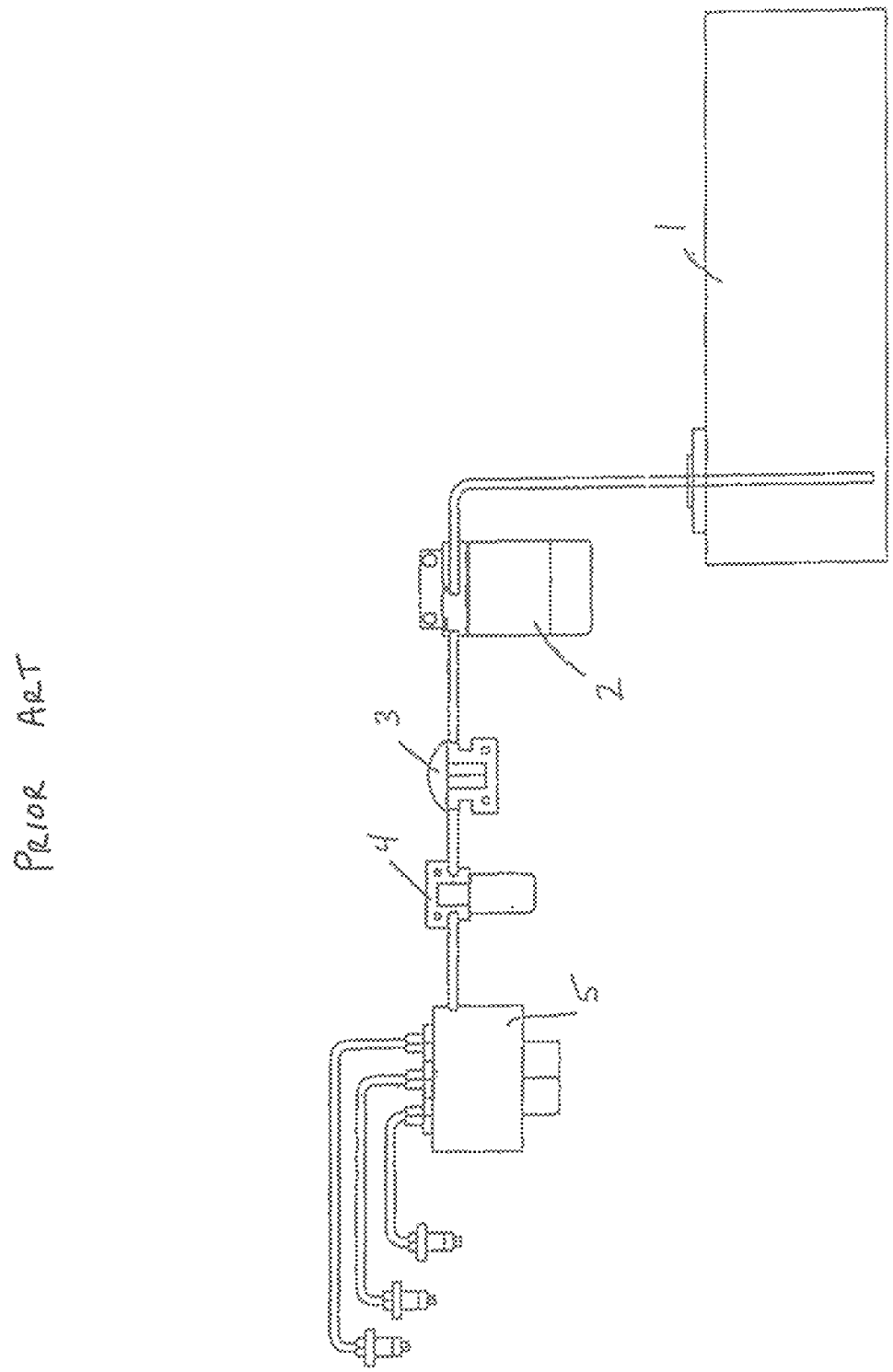
FIG. 32 is a schematic depicting a conventionally known diesel fuel system.

As shown, e.g., in FIGS. 22.24, intake subassembly 276 further comprises a generally cylindrically shaped stem tube 284 extending from base member 282 at about a 45 degree angle therefrom. Stem tube 284 has a channel 286 formed therethrough, wherein channel 286 is in fluid communication with the hollow interior of base member 282. Stem tube 284 of intake subassembly 276 is disposed within inlet channel 224 of first flow housing 206 and is in fluid communication with inlet port 220 of first flow housing 206.

Diffuser cone 278 has a chamber 287 surrounded by a generally frusto-conical shaped body 288. A series of flanges 290 is radially arranged on a top side 292 of body 288, wherein a gap 294 is formed between adjacently situated flanges of series 290. A series of exit holes 296 is formed through a bottom side 298 of diffuser cone 278. Bottom side 298 of diffuser cone 278 further has an opening 300 centrally formed therethrough.

Stator subassembly 280 comprises a neck 302 having an open-ended top side 304 oppositely situated to an open-ended bottom side 306, wherein sides 304 and 306 are in fluid communication with one another via a channel 308 centrally formed through neck 302. Stator subassembly 280 further comprises a vaned member 310 which is contiguously formed with and extends from neck 302. Vaned member 310 has a series of vanes 312, wherein each vane from series 312 is radially disposed around a centrally formed core 316 of member 310, and further wherein each vane from series of vanes 312 is separated from one another by a vertically extending wall 314 which forms the outermost portion of core 316. A plurality of upwelling holes 318 is arranged around a top side 320 of core 316. Stator subassembly 280 further comprises an outer ring 322. Outer ring 322 comprises a generally annular-shaped body 324 which is contiguously formed with neck 302 and with vaned member 310. A plurality of vanes 326 is disposed radially around body 324 of outer ring 322 in such a manner that plurality of vanes 326 extend past the vanes from series of vanes 312 of vaned member 310.

Contaminant separating assembly 274 is arranged such that base member 282 and stem tube 284 of intake subassembly 276 are disposed within chamber 287 of diffuser cone 278 such that a top side of base member 282 extends over series of flanges 290 of diffuser cone 278. Neck 302 of stator subassembly 280 is received within interior 283 of base member 282 of intake subassembly 276 such that core 316, vaned member 310, and outer ring 322 are disposed below bottom side 298 of diffuser cone 278.

First filter assembly 202 further comprises a bowl 328 which has a generally cylindrical shaped body 330 having an open ended top side 332 oppositely situated to a bottom side 334, wherein bottom side 334 has an opening 336 centrally formed therein. Bottom side 334 further has a secondary opening 338 formed therein wherein opening 338 receives and holds a water sensor 340. A chamber 342 is surrounded by body 330 and is in fluid communication with open ended top side 284 and with opening 288 and with water sensor 340. Top side 332 of bowl 328 is centrally positioned against bottom side 210 of first flow housing 206 such that diffuser cone 278 and stator subassembly 280 are enveloped within chamber 342 of bowl 328. A circular shaped seal member 344 is disposed around a perimeter of top side 332 of bowl 328. A retainer ring 346 is disposed around body 330 of bowl 328. Through the use of bolts, retainer ring 346 is bolted to bottom side 210 of first flow housing 206 to thereby secure bowl 328 to first flow housing 206 and to strengthen the integrity of bowl 328.

Filter controller 200 further comprises a heat shield 348. Heat shield 348 comprises a body 350 having an open ended top side 352 oppositely situated to a bottom side 354, a proximal wall 356 oppositely situated to a distal wall 358, and an anterior wall 360 oppositely situated to a posterior wall 362. A well 364 is formed between top side 352, bottom side 354, proximal wall 356, distal wall 358, anterior wall 360, and posterior wall 362. Well 364 is divided into a first section 366 and a second section 368 by a dividing member 370 which extends from anterior to posterior walls 360 and 362. Bottom side 354 has drain holes 372 and 374 formed therethrough, wherein drain hole 372 is formed within first section 366 and drain hole 374 is formed within second section 368. It is noted herein that heat shield 348 is configured to receive and to hold fluid emitted through bowls 328 of first and second filter assemblies 202 and 202'.

A drain 376 is directed towards an exterior wall of bottom side 354 and is received within drain hole 372 and within opening 336 of bowl 328 of first filter assembly 202. Similarly, a drain 378 is directed towards an exterior wall of bottom side 354 and is received within drain hole 374 and within opening 336 of bowl 328 of second filter assembly 202'. Drains 376 and 378 provide an outlet for contaminant particles during the cleaning and/or polishing process.

Bottom side 354 of dividing member 370 of heat shield 348 has holes 380 and 382 formed therethrough. An inlet port extension 384 is fitted into hole 380 and an outlet port extension 385 is fitted into hole 382.

As previously stated, filter controller 200 further comprises directional flow housing 205. Directional flow housing 205 comprises a manifold 386 having a top side 388 oppositely situated to a bottom side 390, an open ended proximal side 392 oppositely situated to a distal side 394, and an anterior side 396 oppositely situated to a posterior side 398. Bottom side 390 of manifold 386 has an inlet port 408 and an outlet port 410 formed therethrough. Inlet port 408 leads into an inlet channel 412 and outlet port 410 leads into an outlet channel 414. Inlet port extension 384 is received through inlet port 408 and held within inlet channel 412, and outlet port extension 385 is received through outlet port 410 and held within outlet channel 414. Therefore, inlet and outlet port extensions 384 and 385 allow an installer to make the necessary connections without having to remove heat shield 348.

Again referring to directional flow housing 205, an outlet porthole 400 and an inlet porthole 402 are formed on posterior side 398 of housing 205, and an outlet porthole 404 and an inlet porthole 406 are formed on anterior side 396 of housing 205. Inlet port 220 of first flow housing 206 of first filter assembly 202 is connected to and is in fluid communication with inlet porthole 402 and with an inlet channel 221 formed through housing 205, while outlet port 222 of first filter assembly 202 is connected to and is in fluid communication with outlet porthole 400 and with an outlet channel 223 formed through housing 205. Inlet port 220 of second flow housing 206' of second filter assembly 202' is connected to and is in fluid communication with inlet porthole 406 and with an inlet channel 225 formed through housing 205, while outlet port 222 of second flow housing 206 of second filter assembly 202' is connected to and is in fluid communication with outlet porthole 404 and with an inlet channel 227 formed through housing 205.

A chamber 416 is formed within manifold 386 of directional flow housing 205. Chamber 416 extends in a direction parallel to proximal and distal sides 392 and 394 and is in fluid communication with channels 221, 223, 225, and 227.

Figure 14:
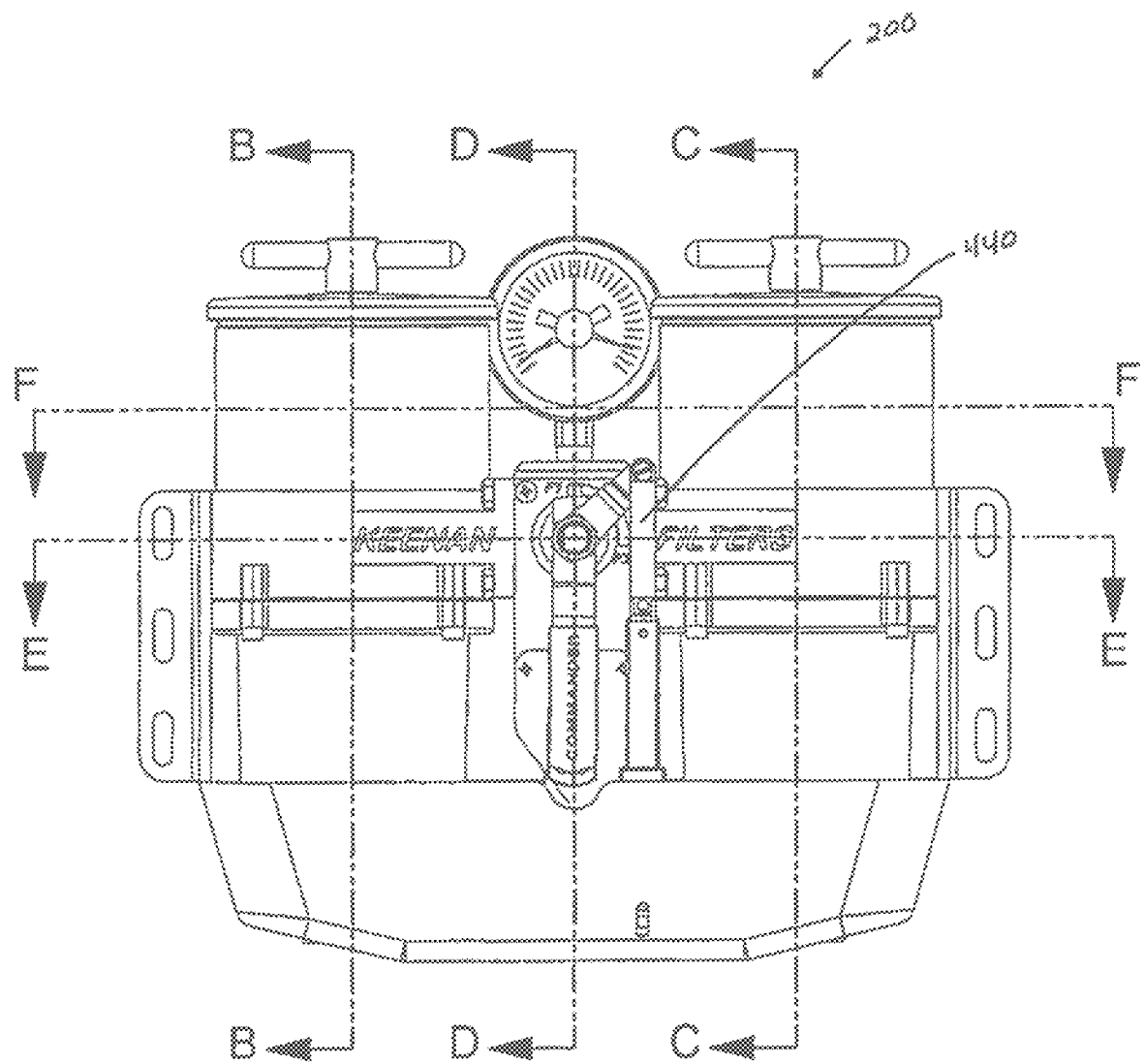
FIG. 14 is a schematic depicting a front side view of the filter controller depicted in FIG. 10.
Figure 15:
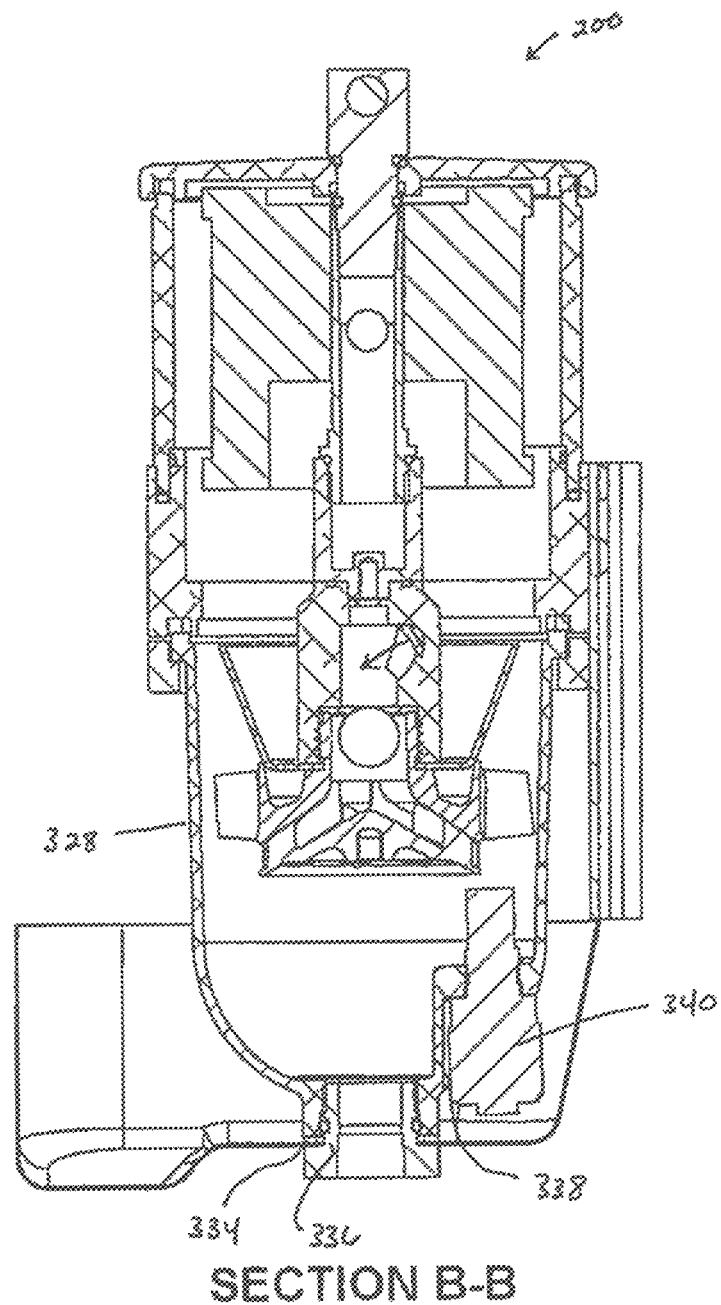
FIG. 15 is a schematic depicting a sectional view along line B-B of the filter controller as shown in FIG. 14.
Figure 16:
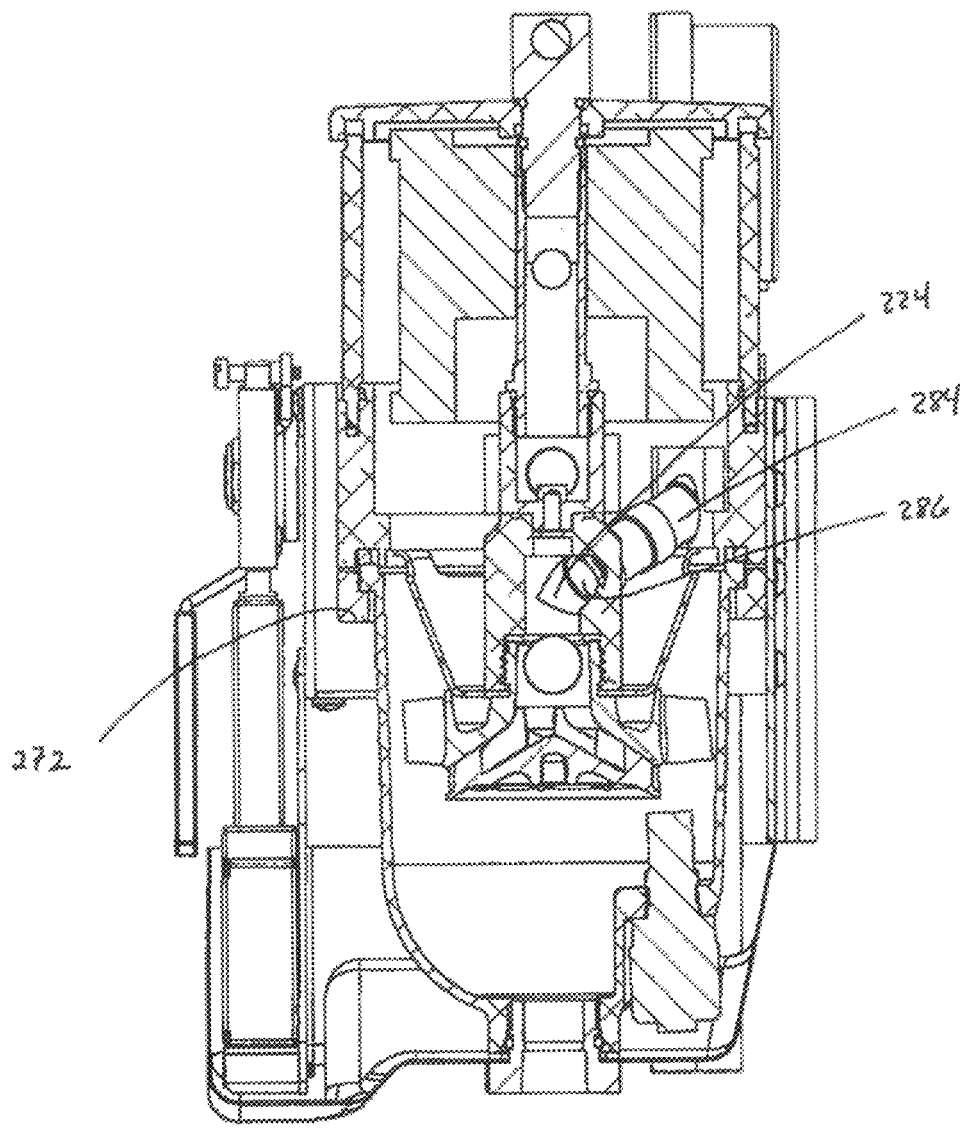
FIG. 16 is a schematic depicting a sectional view along line C-C of the filter controller as shown in FIG. 14.
Figure 17:
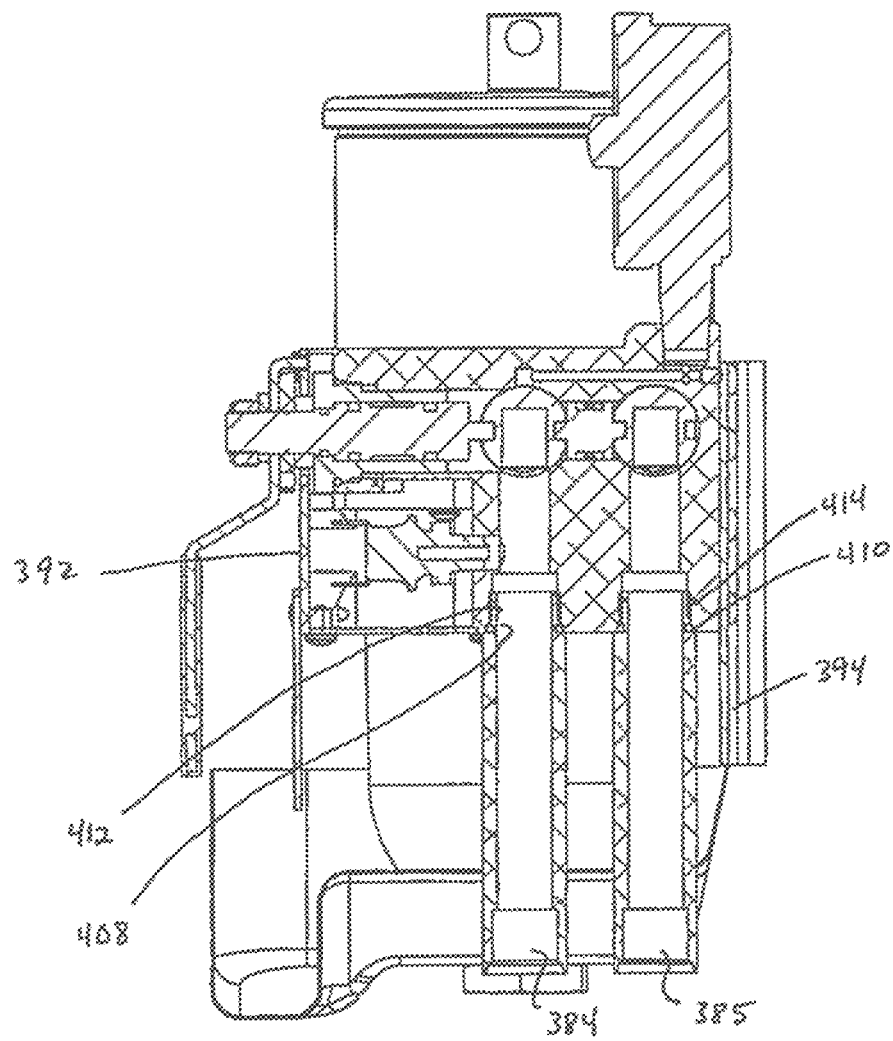
FIG. 17 is a schematic depicting a sectional view along line D-D of the filter controller as shown in FIG. 14.
Figure 18:
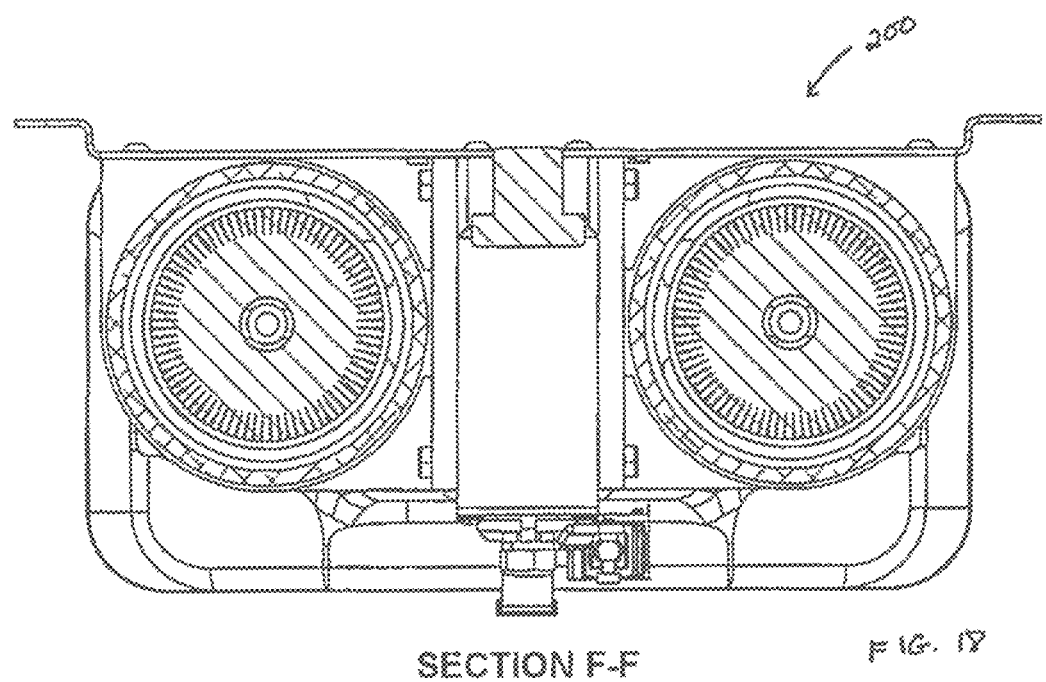
FIG. 18 is a schematic depicting a sectional view along line E-E of the filter controller as shown in FIG. 14.
Figure 19:
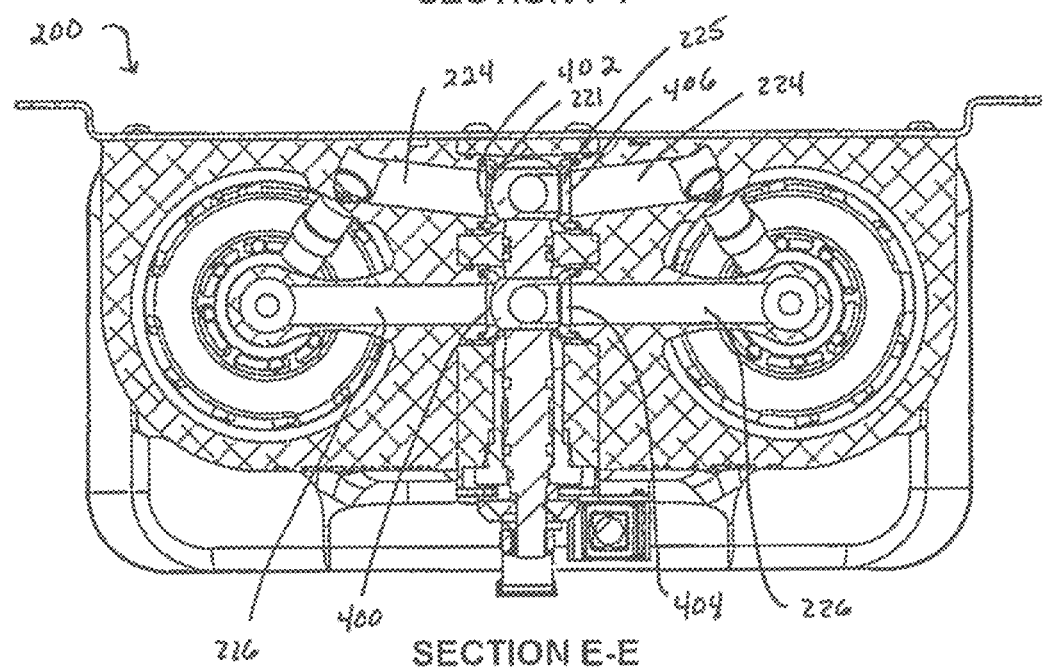
FIG. 19 is a schematic depicting a sectional view along line F-F of the filter controller as shown in FIG. 14.
Figure 20:
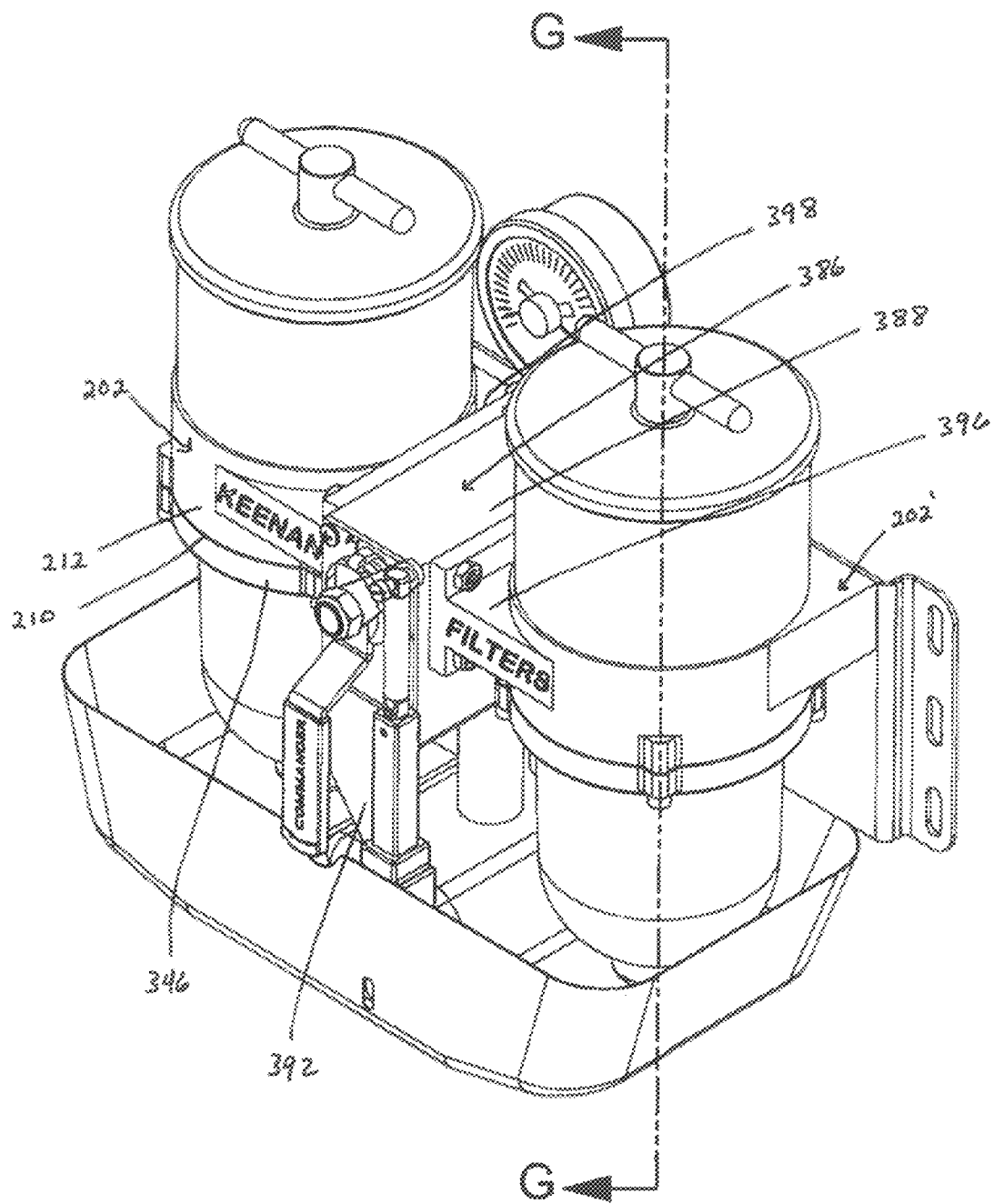
FIG. 20 is a schematic depicting an elevational view of a right side view of the filter controller depicted in FIG. 10.
Figure 21:
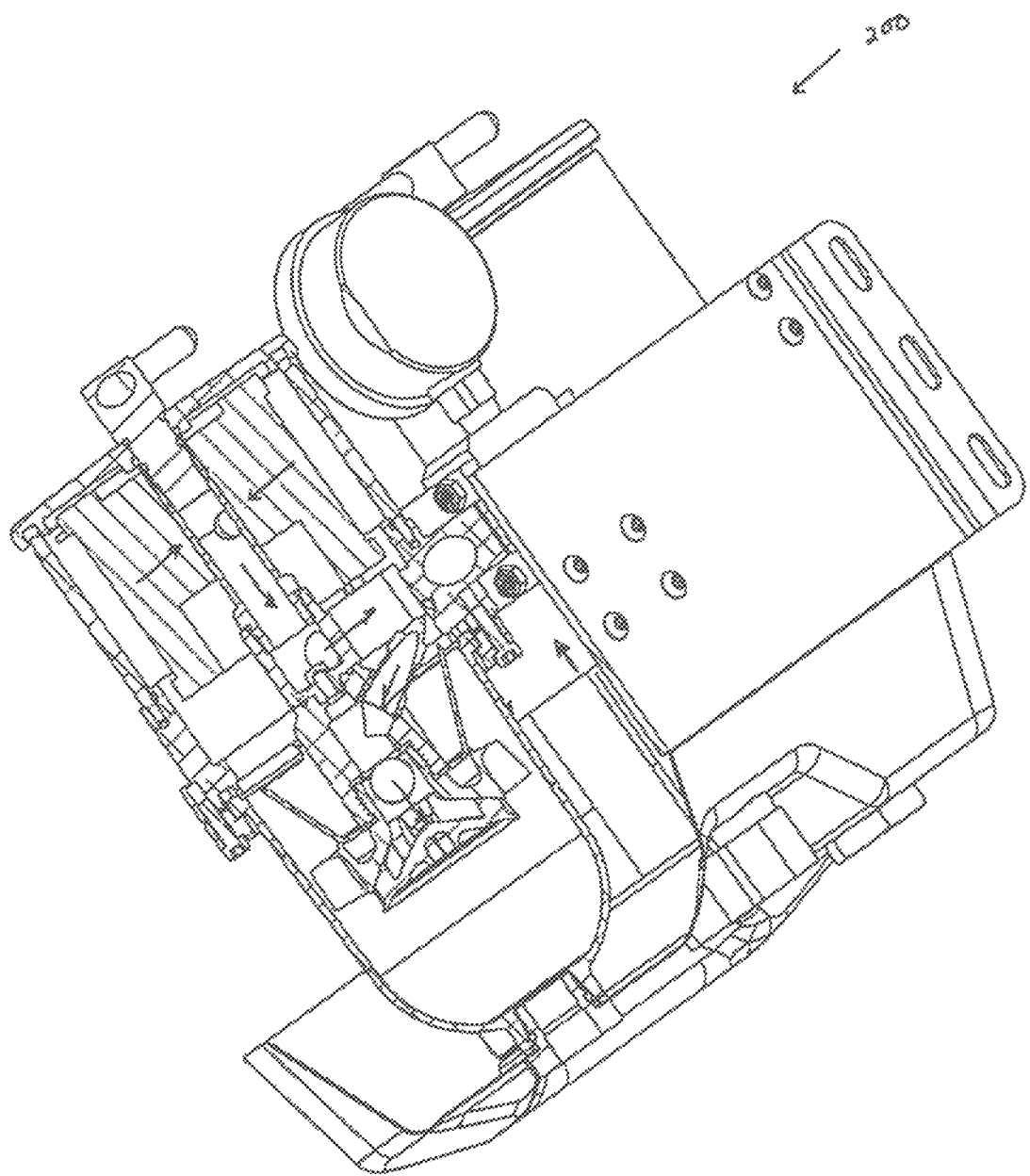
FIG. 21 is a schematic depicting a sectional view along line G-G of the filter controller as shown in FIG. 20.

Filter controller 200 further comprises a directional flow actuator 418. Directional flow actuator 418 comprises a handle 420, a plate 422, a housing drive shaft 424, a shaft drive 426, and directional ball valve components 428. Plate 422 is disposed over open-ended proximal side 392 and is secured thereto via a plurality of screws. Handle 420 is directed to an exterior directed side of plate 422 while housing drive shaft 365 is directed towards an oppositely situated interior directed side of plate 422. A locknut is used to rotatably secure handle 420 to housing drive shaft 424. Shaft drive 426 is fitted within housing shaft drive 426 and is in operable communication with handle 420. Housing drive shaft 424, shaft drive 426, and directional ball valve components 428 are positioned within chamber 416. Directional flow actuator 418 is configured such that an operator can selectively close off the flow of a fluid through portholes 400, 402, 404, and 406, and thereby control which of filter assemblies 202 and 202' is in use. As best shown in FIG. 14, filter controller 200 may further include an actuation member 440 attached to directional flow housing 205 of manifold subassembly 204. Actuation member 440 is capable of turning shaft drive 426 to direct the operation of first and second filter assemblies 202 and 202' via remote or localized signals. An exemplary remote signal may be generated via, e.g., global system for mobile communications technology ("GSM"). The signals may be pre-programmed or transmitted and responded to in real time.

Filter controller 200 further comprises a mount/heat shield 434 which is secured to distal sides 214 of element housings 220 of first and second filter assemblies 202 and 202' and to distal side 394 of manifold 386. A pressure gauge is attached to manifold 386 by inserting a stem 438 of pressure gauge 432 into an opening 436 formed on top side 388 of manifold 386, wherein opening 436 is in fluid communication with chamber 416. A vacuum pressure sensor 430 is positioned within chamber 416 of manifold 386 and is in fluid communication with pressure gauge 432.

In an exemplary application of filter controller 200, a fuel pump (not shown) suctions the fuel from a fuel storage tank (not shown) through second filter assembly 202' whereby second filter assembly 202' eliminates or greatly reduces the passing of contaminants from the fuel storage tank into an injector pump (not shown). More particularly, an engine fuel pump or an electric fuel pump attached to filter controller 200 creates a vacuum to draw fuel from the storage tank and through one of first and second filter assemblies 202 and 202'. The fuel enters inlet port 408 of manifold 386 where ball valve components 428 port the fuel into either the first or second subassembly 202 and 202'.

The fuel enters bowl 328 of either first or second filter assembly 202 and 202' via stem tube 284 of either first or second subassembly 202 and 202'. Vaned member 310 discharges the fuel into a downward rotational pattern that creates a small centrifuge. This allows water and contaminates to separate from the fuel and to drop to the bottom of respective bowls 328 of respective first and second assemblies 202 and 202'. Drains 376 and 378 allow the collected contaminants to flow out of bowls 328 of respective first and second filter assemblies 202 and 202'.

The clean fuel is then drawn upwards and the rotation is stopped by plurality of vanes 326 which allows the fuel flow to slow down and the water and contaminates to separate from the fuel to the bottom of bowls 328 of respective first and second filter assembly 202 and 202'. Fuel now travels upwards and enters diffuser cone 278 of respective first and second filter assemblies 202 and 202' where once again the fuel is slowed down and allows the water and contaminants to separate to the inside of body 288 of diffuser cone 278 of respective first and second filter assemblies 202 and 202'. The separated out water and contaminates exit diffuser cone via respective exit holes 296 after which the water and contaminants drop into bowls 328 of respective first and second filter assemblies 202 and 202'.

The fuel then flows into housing 228 of respective first and second filter assemblies 202 and 202' via respective gaps 294. The fuel is drawn into respective filter member 238 of respective first and second filter assemblies 202 and 202' which filters out remaining contaminants and water. The clean fuel enters filter tube 242 of respective first and second filter assemblies 202 and 202', and then flows through outlet channel 226 of respective first and second filter assemblies 202 and 202' and respectively through outlet channels 223 and 227 of directional flow housing 205. The fuel then exits filter controller 200 via port extension 384.

Should either first or second filter assembly 202 and 202' become ineffective in controlling the level of contaminants that pass through the fuel system, pressure from the fuel pump builds up within filter controller 200. Once the pressure exceeds a preset amount, an operator is notified to switch from the respective first and second filter assembly 202 and 202' to the other of first and second filter assembly 202 and 202', or filter controller 200 can automatically switch between assemblies 202 and 202'. Filter controller 200 can switch between a malfunctioning filter assembly simply by adjusting the position of handle 420 such that the fuel now enters and exits a functioning filter assembly. While filter controller 200 is operating, an operator can replace the malfunctioning filter member.

Another exemplary filter controller is depicted in FIGS. 26-29. Here, a filter controller 500 is essentially identical to filter controller 200 except, e.g., with regards to the manifold subassembly. In addition to including directional flow housing 205, first flow housing 206, and second flow housing 206', a manifold subassembly 502 of filter controller 500 further includes a lower manifold 504. A top side 506 of lower manifold 504 comprises an upper fuel inlet port 508, an upper engine outlet port 510, and an upper tank outlet port 512. A bottom side 514 of lower manifold 504, which is oppositely positioned relative to top side 506, comprises a lower fuel inlet port, a lower engine outlet port, and a lower tank outlet port. A fuel inlet channel, an engine outlet channel, and a tank outlet channel are formed through lower manifold 504, wherein the fuel inlet channel is in fluid communication with upper fuel inlet port 508 and the lower fuel inlet port, the engine outlet channel is in fluid communication with upper engine outlet port 510 and the lower engine outlet port, and the upper tank outlet port channel is in fluid communication with upper tank outlet port 512 and the lower tank outlet port.

Upper fuel inlet port 508 and the fuel inlet channel are in fluid communication with inlet port 408 formed on bottom side 390 of manifold 386, and upper engine outlet port 510 and upper tank outlet port 512 are in fluid communication with outlet port 410 formed on bottom side 390 of manifold 386. An open area formed on bottom side 514 of lower manifold 504 is covered by a plate 516. Plate 516 has openings 518, 520, and 522 formed through a top and bottom side of plate 516.

Lower manifold 504 further includes components that allow for the visualization of the functionality of filter controller 500 and/or which allow a user to manually control the operations of filter controller 500. To that end, a proximal side 524 of lower manifold 504 has a lower opening 526 formed through an upper portion of proximal side 524. Proximal side 524 further comprises an upper opening 528 formed through proximal side 524, wherein upper opening 528 leads into an upper compartment 530 formed through manifold 504. A plate 532 is positioned over proximal side 524.

Plate 532 comprises an actuator opening 534 formed therethrough which receives directional flow actuator 418, a first flow housing switch opening 536 formed therethrough which receives a switch 552 that directs the fluid to first filter assembly 202, a second flow housing switch opening 538 formed therethrough which receives a switch 554 that directs the fluid to second filter assembly 202', a power actuation hole 542 formed therethrough which receives a switch that that turns filter controller on and off, a power on indicator hole 558 formed therethrough which receives a member 560 that indicates when multiple filter controller 500 is turned "on", a pump actuation hole 572 which receives a pump actuation switch 574 which is in electrical communication with circuitry contained within lower manifold 504 which provides the power to turn on a fuel pump located downstream of filter controller 500 wherein the fuel pump generates the driving force that moves a fluid from a storage tank and through filter controller, a pump on indicator hole 562 formed therethrough which receives a member 564 that indicates when a pump is turned "on"; a check filter indicator hole 544 formed therethrough which receives a member 556 that signals when filter controller 500 is working properly, a check water indicator hole 546 formed therethrough that receives a member 566 that signals when filter controller 500 is working properly, a pressure gauge hole 548 formed therethrough which receives a pressure gauge 568, and a flow sight member hole 550 which receives a flow sight member 570. Flow sight member 570 comprises a transparent window which allows for the visibility of the flow of fuel through filter controller 500.

Unlike filer controller 200, filter controller 500 does not include inlet and outlet port extensions 384 and 385 as bottom side 514 of lower manifold 504 rests on dividing member 370 of heat shield 348.

In an exemplary embodiment, filter controller 500 further comprises a pump assembly 600. Assembly 600 comprises a pump 602, upper plumbing 604, and lower plumbing 606.

Second flow housing 206' of second filter assembly 202' comprises an intake port 608 that leads into an intake channel formed within second flow housing 206' and an outtake port 610 that leads into an outtake channel formed within second flow housing 206'. Pump 602 is attached to second flow housing 206' via lower plumbing 606 that is in fluid communication with pump 602 and with intake port 608 and via upper plumbing 604 that is connected to pump 602 and to outtake port 610. In this embodiment, pump 602 generates a fuel pressure within filter controller 500. This pressure is sufficient to draw the flow of fuel through fuel assemblies 202 and 202, to clean bowls 328, to draw the flow of fuel to a fuel storage tank, and to draw the flow of fuel to an engine.

In addition to the differences set forth above herein, filter controller 500 differs from filter controller 200 in that filter controller 500 is capable of polishing the fuel, that is, it is capable of sending the filtered fuel back into the storage tank. Accordingly, in an exemplary embodiment, the fuel flows in much the same was as it does in filter controller 200 except that the fuel enters filter controller 500 from fuel inlet port 508 located on bottom side 514 of lower manifold 504. The fuel then flows into inlet channel 412 of manifold 386. The fuel then flows as discussed above with reference to filter controller 200. However, once the filtered fuel enters lower manifold 504, it can be directed either to upper engine outlet port 510 or, if a fuel pump is on, to upper tank outlet port 512.

It is noted that the applications of the filter controller as disclosed herein are varied, and that they include any system where back-up filters are desired. Such systems may comprise for example, trailers, campers, and marine engine systems. It is further noted that although the primary fluid discussed herein was a fuel source, the fluid is not to be limited thereby, but may include any fluid which is to be filtered and which any one of ordinary skill in the art after having read this disclosure would deem fitted for use in the filter controllers disclosed and/or contemplated herein.

Additionally any of the filter controllers disclosed herein may include a means thereon which can provide a remote alert that the filters may be malfunctioning or may be in need of repair or that the fuel should be cleaned or polished. For example, the systems may include a device that can communicate over a wireless network to a mobile phone to provide such a remote alert.

The benefits of the filter controller as disclosed herein are many. For example, the filter controller provides a reliable back-up support for a system dependent upon the use of a filter. Additionally, the filter controller can continue operating the system while an operator replaces or fixes a faulty filter. Also, the filter controller provides a simplified means for integration with an internal combustion or gas turbine engine assembly.

It is to be understood that the filter controller disclosed herein has a wide variety of applications and uses and is not to be limited to the specific applications described herein. The filter controller can also filter a wide variety of fluids depending on the application of use of the filter controller. Nonetheless, the filter controller has particular advantages in the use of filtering fluids such as diesel-containing fuels, ethanol-containing fuels, petroleum-containing fuels, and the like and has particular advantages in the boating, trucking, and generator industries.

It is further intended that any other embodiments of the present invention that result from any changes in application or method of use or operation, method of manufacture, shape, size, or fluid which are not specified within the detailed written description or illustrations contained herein, yet are considered apparent or obvious to one skilled in the art, are within the scope of the present invention.

What is claimed is:

1. A filter controller, comprising:
    a first flow housing having a first opening, a second opening, a first inlet opening and a first outlet opening;
    a second flow housing having a first opening, a second opening, a second inlet opening and a second outlet opening;
    a directional flow housing having a third inlet opening, a fourth inlet opening, a third outlet opening, a fourth outlet opening, an inlet port, and an outlet port, wherein a fluid enters the filter controller via the inlet port from a fluid source and the fluid exits the filter controller via the outlet port, and further wherein:
    the first inlet opening of the first flow housing is in fluid communication with the third inlet opening and the inlet port of the directional flow housing; the second inlet opening of the second flow housing is in fluid communication with the fourth inlet opening and the inlet port of the directional flow housing; the first outlet opening of the first flow housing is in fluid communication with the third outlet opening and the outlet port of the directional flow housing, and the second outlet opening of the second flow housing is in fluid communication with the fourth outlet opening and the outlet port of the directional flow housing; and
        a first filter assembly and a second filter assembly, wherein each of the first and second filter assemblies comprises:
            an upper filter subassembly comprising:
                a filter housing having an open-ended top side oppositely situated to an open-ended bottom side;
                a filter element disposed within the filter housing; and
                a filter tube having a body surrounded by the filter element, and further wherein the filter tube of the first filter assembly is in fluid communication with the first outlet opening of the first flow housing and with the third outlet opening and the outlet port of the directional flow housing, and wherein the filter tube of the second filter assembly is in fluid communication with the second outlet opening of the second flow housing and with the fourth outlet opening and the outlet port of the directional flow housing;
        wherein the filter housing of the first filter assembly is physically disposed on the first flow housing such that the open-ended bottom side of the filter housing of the first filter assembly is aligned with the first opening of the first flow housing, and wherein the filter housing of the second filter assembly is physically disposed on the second flow housing such that the open-ended bottom side of the filter housing of the second filter assembly is aligned with the first opening of the second flow housing; and
        a lower filter subassembly, comprising:
            a bowl having an open-ended top side oppositely situated to a bottom side, and a chamber which extends from the top and the bottom sides of the bowl, wherein the top side of the bowl of the first filter assembly is secured to the first flow housing, and the top side of the bowl of the second filter assembly is secured to the second flow housing; and
            a contaminant separating assembly which is disposed within the chamber of the bowl, and further wherein the contaminant separating assembly of the first filter assembly is secured to the first flow housing via the second opening of the first flow housing, and the contaminant separating assembly of the second filter assembly is secured to the second flow housing via the second opening of the second flow housing.

2. The filter controller of claim 1, further comprising one or more additional filter elements disposed within each of the filter housings of the first and second filter assemblies, wherein the one or more additional filter elements are vertically stacked on the filter element such that each of the one or more additional filter elements are disposed around the body of the filter tube of the respective first and second filter subassemblies.

3. The filter controller of claim 1, wherein the contaminant separating assemblies of each of the first and second filter assemblies comprises:
    a stem tube having an open-ended neck region, wherein the neck region of the first filter assembly is physically engaged within the second opening of the first flow housing, and the neck region of the second filter assembly is physically engaged within the second opening of the second flow housing, and wherein the stem tube of the first filter assembly is in fluid communication with the first inlet opening of the first flow housing and the stem tube of the second filter assembly is in fluid communication with the second inlet opening of the second flow housing;
    a diffuser cone having a chamber surrounded by a generally frusto-conical shaped body having an open-ended top side oppositely situated to an open-ended bottom side; and
    a stator having an engagement member which extends through the chamber of the diffuser cone and which is received by the stem tube.

4. The filter controller of claim 3, wherein each of the diffuser cones of the first and second filter assemblies comprises a series of flanges, wherein the flanges are radially arranged on the top side of the body of the cone such that a gap is formed between adjacently situated flanges from the series, and wherein a series of exit holes is formed on the bottom side of the body of the diffuser cone.

5. The filter controller of claim 4, wherein each of the stators of the first and second filter assemblies comprises:
   an engagement member which extends through the chamber of the diffuser cone and which is received within the stem tube; and
   a generally cylindrically-shaped body from which the engagement member vertically extends, and upon which is radially disposed a plurality of vanes, wherein each vane from the plurality has an upwelling hole formed therethrough; and
   a ring of radially disposed vanes, wherein the ring is positioned around the generally cylindrically-shaped body of the stator;
wherein the generally cylindrically-shaped body of the stator and the ring of the stator are directed towards the bottom side of the diffuser cone.

6. The filter controller of claim 1, wherein the fluid is a diesel-containing fuel.

7. The filter controller of claim 1, wherein the fluid is an ethanol-containing fuel.

8. The filter controller of claim 1, further comprising a heat shield, wherein the heat shield comprises a body having an open-ended top side oppositely situated to a bottom side, and a lateral side that surrounds a chamber, wherein the bottom side of the heat shield has a first opening and a second opening formed therethrough, and further wherein each of the bottom sides of the bowls of the first and second filter assemblies has a hole formed therethrough, wherein the hole of the bowl of the first filter assembly is aligned with the first hole of the heat shield and the hole of the bowl of the second filter assembly is aligned with the second hole of the heat shield.

9. The filter controller of claim 8, wherein the bottom side of the heat shield further comprises a third opening and a fourth opening, wherein the third opening of the heat shield is aligned with the inlet port of the directional flow housing and the fourth opening of the heat shield is aligned with the outlet port of the directional flow housing, and further wherein the filter controller comprises an inlet port extension tube and an outlet port extension tube, wherein the inlet port extension tube is disposed through the third opening of the heat shield and is received by and held to the inlet port of the directional flow housing, and the outlet port extension tube is disposed through the fourth opening of the heat shield and is received by and held to the outlet port of the directional flow housing.

10. The filter controller of claim 1, further comprising a pump assembly comprising a pump, an upper plumbing, and a lower plumbing, wherein the pump is in operable communication with the upper plumbing and the lower plumbing, and further wherein the second flow housing comprises an intake port and an outtake port, and further wherein the upper plumbing is in fluid communication with the intake port of the second flow housing, and the lower plumbing is in fluid communication with the outtake port of the second flow housing, wherein the pump generates a pressure within the filter controller sufficient to draw a flow of the fluid through the first and second filter assemblies, to the fluid source, and to the outlet port of the directional flow housing.

11. The filter controller of claim 10, wherein the pump is physically disposed on and secured to the second flow housing.

12. The filter controller of claim 1, further comprising a directional flow actuator in operable communication with the directional flow housing, wherein the directional flow actuator controls whether the fluid flows through the first filter assembly and/or the second filter assembly.

13. The filter controller of claim 12, wherein the directional flow actuator comprises a housing drive shaft, a shaft drive disposed within the housing drive shaft, and a directional ball valve, and wherein the directional flow housing further comprises an actuator port which holds the housing drive shaft, the shaft drive, and the directional ball valve.

14. The filter controller of claim 13, further comprising an actuation member which controls the directional flow actuator via a remote signal.

15. The filter controller of claim 14, wherein the actuation member comprises global system for mobile communications technology.

* * * * *